(12) United States Patent
Ohkawa et al.

(10) Patent No.: US 7,378,768 B2
(45) Date of Patent: May 27, 2008

(54) STEPPING MOTOR AND METHOD OF MANUFACTURING THE SAME

(75) Inventors: Takanori Ohkawa, Susono (JP); Takashi Ida, Susono (JP); Osamu Kodaira, Susono (JP)

(73) Assignee: Mitsubishi Materials C.M.I. Corporation, Shizuoka (JP)

( * ) Notice: Subject to any disclaimer, the term of this patent is extended or adjusted under 35 U.S.C. 154(b) by 209 days.

(21) Appl. No.: 10/555,413

(22) PCT Filed: Jun. 18, 2004

(86) PCT No.: PCT/JP2004/008600

§ 371 (c)(1),
(2), (4) Date: Nov. 3, 2005

(87) PCT Pub. No.: WO2005/002028

PCT Pub. Date: Jan. 6, 2005

(65) Prior Publication Data

US 2006/0290226 A1 Dec. 28, 2006

(30) Foreign Application Priority Data

| Jun. 27, 2003 | (JP) | ............................. 2003-184611 |
| Aug. 21, 2003 | (JP) | ............................. 2003-297749 |
| Oct. 6, 2003 | (JP) | ............................. 2003-347174 |
| Oct. 14, 2003 | (JP) | ............................. 2003-353748 |

(51) Int. Cl.
*H02K 37/14* (2006.01)

(52) U.S. Cl. .................. 310/71; 310/49 R; 310/194
(58) Field of Classification Search ................ 310/194, 310/71, 49 R
See application file for complete search history.

(56) References Cited

FOREIGN PATENT DOCUMENTS

| JP | 61-121764 | 6/1986 |
| JP | 3-66574 | 6/1991 |
| JP | 5-207725 | 8/1993 |
| JP | 5-284717 | 10/1993 |
| JP | 5-91191 | 12/1993 |
| JP | 8-145222 | 6/1996 |
| JP | 11-241668 | 9/1999 |
| JP | 2001-78419 | 3/2001 |

*Primary Examiner*—Burton Mullins
(74) *Attorney, Agent, or Firm*—Wenderoth, Lind & Ponack, L.L.P.

(57) ABSTRACT

An object of the present invention is to provide a stepping motor capable of reducing the number of components and the number of assembling steps, and its manufacturing method. In order to achieve the object, a stepping motor according to the present invention is constructed to include a bobbin which integrally holds a yoke and a connector housing which is disposed at one end portion in an axial direction of the bobbin and integrally holds a pin for connecting a coil wound around the bobbin to an external conductor, and to integrally form the bobbin and the connector housing of a resin.

2 Claims, 22 Drawing Sheets

PRIOR ART
PRIOR ART
FIG. 39A
FIG. 39B
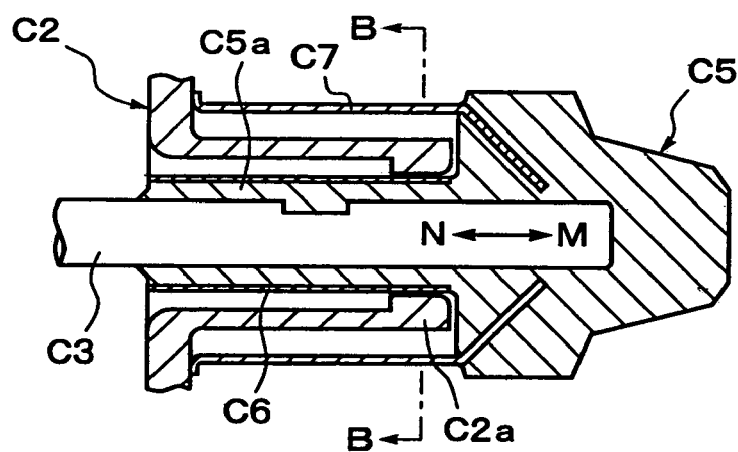
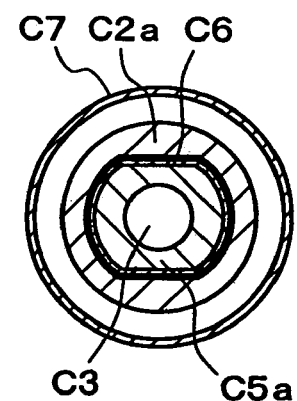

STEPPING MOTOR AND METHOD OF MANUFACTURING THE SAME

TECHNICAL FIELD

The present invention relates to a stepping motor including a bobbin and a connector housing, and its manufacturing method.

BACKGROUND ART

As this kind of stepping motor, for example, the one disclosed in Patent Document 1 (Japanese Patent Laid-open No. 5-284717) is known. The stepping motor includes a molded bobbin (bobbin) molded of a resin of polybutylene terephthalate (PBT) to integrally hold a magnetic plate (yoke), and an electric connector (connector housing) which is disposed at one end portion in an axial direction of the molded bobbin and is molded of a resin of polyethylene terephthalate (PET) to integrally hold an electric terminal (pin) for connecting an end portion of a coil (winding wire) that is wound around the above described bobbin, and is constructed by ultrasonic welding of opposing resin surfaces of the above described bobbin and electric connector.

In the above described conventional stepping motor, however, the molded bobbin and the electric connector are constructed by separate pieces, and therefore, in order to fix the electric connector to the molded bobbin, ultrasonic welding as described above or another means has to be used, which causes the problem of being incapable of reducing the number of components and assembling steps.

Patent Document 1: Japanese Patent Laid-open No. 5-284717

DISCLOSURE OF THE INVENTION

The present invention is made in view of the above described circumstances, and has an object to provide a stepping motor capable of reducing the number of components and number of assembling steps and its manufacturing method.

In order to solve the above described problem, a first embodiment of the present invention is a stepping motor including a bobbin which integrally holds a yoke for constructing a magnetic circuit, and a connector housing which is disposed at one end portion in an axial direction of the bobbin and integrally holds a pin for connecting a winding wire wound around the above described bobbin to an external conductor, wherein the above described bobbin and the above described connector housing are integrally formed of a resin.

A second embodiment of the present invention is, in the above described first embodiment, wherein the above described bobbin has a flange part projected outward in a radius direction to restrict a winding position of the above described winding wire in the above described axial direction, the above described connector housing has a terminal installation surface adjacent to the above described flange part disposed at one end portion in the above described axial direction in the above described bobbin and formed at an inner position in the radius direction with respect to an outer peripheral edge of the flange part, the above described pin is constructed so that its one end portion projects from the above described terminal installation surface to be a terminal part connecting an end portion of the above described winding wire and the terminal part is folded to be in close vicinity to the above described terminal installation surface, and thereby, the entire above described terminal part including the connecting part of the above described winding wire is located at an inner position in the radius direction with respect to the outer peripheral edge of the above described flange part, and an auxiliary bobbin part, which is formed at an inner position in the radius direction with respect to the above described terminal installation surface, and around which a winding wire connected to the above described terminal part is capable of being wound, is provided between the above described terminal installation surface and the above described flange part adjacent to this terminal installation surface.

A third embodiment of the present invention is, in the above described first embodiment, wherein the above described bobbin has a flange part projected outward in a radius direction to restrict a winding position of the above described winding wire to the above described axial direction, the above described connector housing has a terminal installation surface adjacent to the above described flange part disposed at one end portion in the above described axial direction in the above described bobbin and formed at an inner position in the radius direction with respect to an outer peripheral edge of the flange part, and the above described pin is constructed so that its one end portion projects from the above described terminal installation surface to be a terminal part connecting an end portion of the above described winding wire, and an upper end including a connecting portion of the above described winding wire in the terminal part is located at an inner position in the radius direction with respect to the outer peripheral edge of the above described flange part.

A fourth embodiment of the present invention is, in the above described third embodiment, wherein an auxiliary bobbin part, which is formed at an inner position in the radius direction with respect to the above described terminal installation surface, and a round which a winding wire connected to the above described terminal part is capable of being wound, is provided between the above described terminal installation surface and the above described flange part adjacent to this terminal installation surface.

A fifth embodiment of the present invention is a manufacturing method of the stepping motor described in any one of the above described first to fourth embodiments, wherein the above described bobbin and the above described connector housing are integrally molded of a continuously supplied resin.

A sixth embodiment of the present invention is a manufacturing method of the stepping motor shown in any one of the above described first to fourth embodiments, wherein after the above described bobbin is resin-molded, the above described connector housing is resin-molded to be integrated with the bobbin.

A seventh embodiment of the present invention is a manufacturing method of the stepping motor described in any one of the above described first to fourth embodiments, wherein after the above described connector housing is resin-molded, the above described bobbin is resin-molded to be integrated with the connector housing.

An eighth embodiment of the present invention includes a bobbin around which a winding wire is wound, the above described yoke provided to be along an end surface in an axial direction of the bobbin from an inner peripheral surface of the bobbin, and a case which is formed into a cylinder shape to enclose the yoke, the above described bobbin and an outer peripheral side of the above described winding wire, is in close contact with an outer peripheral edge of the above described yoke and constructs an magnetic circuit with the yoke, wherein in the above described case, a flange connected to the motor installation member in the state in which it abuts on the motor installation member is provided at one end portion in an axial direction.

The eighth embodiment of the present invention may have the structure "includes a bobbin around which a winding wire is wound, the above described yoke provided to be along an end surface in an axial direction of the bobbin from an inner peripheral surface of the bobbin, and a case which is formed into a cylinder shape to enclose the yoke, the above described bobbin and an outer peripheral side of the above described winding wire, is in close contact with an outer peripheral edge of the above described yoke and constructs an magnetic circuit with the yoke, wherein in the above described case, a flange connected to the motor installation member in the state in which it abuts on the motor installation member is provided at one end portion in an axial direction", in any one of the above described first to fourth embodiment.

A ninth embodiment of the present invention is, in the above described eighth embodiment, wherein the bobbin around which the above described winding wire is wound, the above described yoke and the above described case are integrally connected by a resin in a state in which an abutting surface on the above described motor installation member in the above described flange is exposed.

The ninth embodiment of the present invention may have the construction "the bobbin around which the above described winding wire is wound, the above described yoke and the above described case are integrally connected by a resin in a state in which an abutting surface on the above described motor installation member in the above described flange is exposed" in any one of the above described first to fourth embodiments or in the above described eighth embodiment.

A tenth embodiment of the present invention includes a bobbin around which a winding wire is wound, a yoke provided to enclose the bobbin, and heat release means with one end portion in close contact with the above described yoke and the other end portion provided with a flange connected to the motor installation member in a state in which it abuts on the motor installation member, wherein the above described bobbin around which the winding wire is wound, the above described yoke and the above described heat release means are integrally connected by a resin in the state in which the abutting surface on the above described motor installation member in the above described flange is exposed.

The tenth embodiment of the present invention may have the construction "includes a bobbin around which a winding wire is wound, a yoke provided to enclose the bobbin, and heat release means with one end portion in close contact with the above described yoke and the other end portion provided with a flange connected to the motor installation member in a state in which it abuts on the motor installation member, wherein the above described bobbin around which the winding wire is wound, the above described yoke and the above described heat release means are integrally connected by a resin in the state in which the abutting surface on the above described motor installation member in the above described flange is exposed" in any one of the above described first to fourth embodiments.

An eleventh embodiment of the present invention is a stepping motor including a yoke made of a magnetic material having a magnetic pole part disposed along an inner peripheral surface of a bobbin around which a winding wire is wound and a planar part disposed along an end surface in an axial direction of the above described bobbin, and a case of a magnetic material which has a cylindrical part fitted onto an outer peripheral edge of the planar part in a state in which the above described planar part in the yoke is placed inside and constructs a part of the magnetic circuit with the above described yoke, wherein a recessed portion in a recessed shape with respect to the outer peripheral edge is provided at the outer peripheral edge of the above described planar part, and a connecting recessed portion into which the above described recessed portion is pushed in the state in which the above described cylindrical part is fitted onto the outer peripheral edge of the above described planar part is provided at the outer peripheral edge of the above described planar part.

The eleventh embodiment of the present invention may have the construction "a stepping motor including a yoke made of a magnetic material having a magnetic pole part disposed along an inner peripheral surface of a bobbin around which a winding wire is wound and a planar part disposed along an end surface in an axial direction of the above described bobbin, and a case of a magnetic material which has a cylindrical part fitted onto an outer peripheral edge of the planar part in a state in which the above described planar part in the yoke is placed inside and constructs a part of the magnetic circuit with the above described yoke, wherein a recessed portion in a recessed shape with respect to the outer peripheral edge is provided at the outer peripheral edge of the above described planar part, and a connecting recessed portion into which the above described recessed portion is pushed in the state in which the above described cylindrical part is fitted onto the outer peripheral edge of the above described planar part is provided at the outer peripheral edge of the above described planar part" in any one of the above described first to fourth embodiments or the above described eighth or ninth embodiment.

A twelfth embodiment of the present invention is, in a stepping motor having a stator, in which a rotor is rotatably inserted in the above described stator, a shaft is screwed into the above described rotor to be able to advance and retreat in its axial direction, a controlled body is mounted to a tip end of the above described shaft, and a rotation restricted part in a non-circular sectional shape is formed at the above described controlled body, a rotation restricting part is formed at the above described stator in a form fitted to the rotation restricted part, wherein an abrasion reduction/axial direction locking member in a flanged cylinder shape is mounted to the rotation restricting part of the above described stator, the rotation restricted part of the above described controlled body slides with respect to the cylindrical part of the abrasion reduction/axial direction locking member, and the above described controlled body abuts on the flange part of the abrasion reduction/axial direction locking member to stop a retreating motion of the above described shaft.

The twelfth embodiment of the present invention may have the construction "in a stepping motor having a stator, in which a rotor is rotatably inserted in the above described stator, a shaft is screwed into the above described rotor to be able to advance and retreat in its axial direction, a controlled body is mounted to a tip end of the above described shaft, and a rotation restricted part in a non-circular sectional shape is formed at the above described controlled body, a rotation restricting part is formed at the above described stator in a form fitted to the rotation restricted part, wherein an abrasion reduction/axial direction locking member in a flanged cylinder shape is mounted to the rotation restricting part of the above described stator, the rotation restricted part of the above described controlled body slides with respect to the cylindrical part of the abrasion reduction/axial direction locking member, and the above described controlled body abuts on the flange part of the abrasion reduction/axial direction locking member to stop a retreating motion of the above described shaft" in any one of the above described first to fourth embodiments or any one of the above described eighth to eleventh embodiments.

As the above described controlled body, for example, a valve body of a valve can be cited. As the non-circular sectional shape, a double D cut sectional shape or the like is conceivable.

A thirteenth embodiment of the present invention is, in the above described twelfth embodiment, wherein a cylindrical skirt part is formed at the above described controlled body to cover a periphery of at least the above described abrasion reduction/axial direction locking member.

The thirteenth embodiment of the present invention may have the construction "a cylindrical skirt part is formed at the above described controlled body to cover a periphery of at least the above described abrasion reduction/axial direction locking member." in any one of the above described first to fourth embodiments or in any one of the above described eighth to twelfth embodiments.

According to the first to fourth embodiments of the present invention, the bobbin and the connector housing are integrally molded of a resin, and therefore, the number of components and the number of assembling steps can be reduced as compared with the conventional one in which the bobbin and the connector housing are respectively included separately and the bobbin and the connector housing are connected by ultrasonic welding or the like at the time of assembly.

As compared with the conventional case in which the bobbin and the connector housing are connected by ultrasonic welding, there is no possibility of occurrence of strength deterioration due to welding failure at the connecting portion of the bobbin and the connector housing, and reliability in strength can be enhanced. Further, ultrasonic vibration of high energy does not act on the bobbin and the connector housing, and therefore, there is no possibility of breakage occurring to the bobbin and the connector housing by the ultrasonic vibration. Furthermore, a machine (ultrasonic welding machine) for ultrasonic welding is generally expensive, but there is no need to use such an expensive ultrasonic welding machine, and therefore, the cost can be reduced correspondingly.

According to the second embodiment of the present invention, the winding wire is stably held at the auxiliary bobbin part by winding the winding wire around the auxiliary bobbin part. Therefore, the end portion of the winding wire can be easily wound from the root portion of the terminal part to the upper end portion. Namely, the end portion of the winding wire can be easily bound to the terminal part. Since the winding wire can be stably held at the auxiliary bobbin part, and therefore, the winding wire is easily wound around the bobbin.

The winding wire extends to the auxiliary bobbin part at the lower position from the root portion of the terminal part and is wound around the auxiliary bobbin part, and therefore, even when the terminal part is folded from its root part to be in close vicinity to the terminal installation surface after the winding wire is soldered to the terminal part, for example, the winding wire extending from the terminal part can be prevented from being loosened as much as possible.

Accordingly, such incidences that the loosened portion of the winding wire is caught between the terminal part and the terminal installation surface and is cut, or the coating of the winding wire is peeled off and the winding wire at the peeled portion and the terminal part are short-circuited can be prevented.

After the terminal part is folded, the connecting portion formed by soldering the winding wire to the terminal portion as described above is located inside the radius direction from the outer peripheral edge of the flange part, and therefore, when covering along the outer peripheral edge of the flange part of the bobbin with, for example, the case, the terminal part and the connecting portion of the winding wires can be prevented from hitting the case.

In order to prevent tensile force from acting on the winding wire, it is preferable to fold the terminal part to the auxiliary bobbin part side, namely, to the flange part side.

Connection of the winding wire to the terminal part can be reliably achieved by welding by arc, plasma, laser or the like other than the above described soldering, the terminal part including the connecting portion by the welding is also located at an inner position in the radius direction with respect to the outer peripheral edge of the flange part by folding the terminal part from its root portion to be in close vicinity to the terminal installation surface.

According to the third embodiment of the present invention, by, for example, performing welding from the upper end portion side of the terminal part after binding the end portion of the winding wire to the terminal part, the connecting portion which connects the winding wire to the upper end portion of the terminal part is constructed, and since the upper end of the terminal part including this connecting portion is constructed to be located at the inner position in the radius direction with respect to the outer peripheral edge of the flange part of the bobbin, the upper end of the terminal part including the connecting portion can be prevented from projecting from the outer peripheral edge of the flange part. Accordingly, the number of steps required for folding the terminal part can be reduced.

In addition, since it is not necessary to fold the terminal part to the flange part side, a space in the axial direction which is required for the folding does not become necessary. Accordingly, the length in the axial direction can be made short by the amount of the above described space, and the stepping motor can be made compact.

According to the fourth embodiment of the present invention, the auxiliary bobbin part is provided between the terminal installation surface and the adjacent flange part with respect to the above described third embodiment of the present invention, and therefore, binding the terminal portion of the winding wire to the terminal part and winding the terminal portion around the bobbin can be performed easily in the state in which the winding wire is held by being wound around the auxiliary bobbin part.

According to the fifth embodiment of the present invention, by continuously supplying a resin into the mold with the yoke and the pin inserted in the mold for molding the bobbin and the connector housing, the bobbin in the state integrally holding the yoke and the connector housing in the state integrally holding the pin are integrally molded substantially at the same time. Accordingly, the stepping motor excellent in strength and extremely high in reliability without a problem such as breakage due to ultrasonic vibration or the like can be manufactured with less cost and time.

According to the sixth embodiment of the present invention, by supplying a resin into the mold with the yoke inserted in the mold for molding the bobbin, the bobbin in the state integrally holding the yoke can be molded. After the bobbin is molded, the resin is supplied into the mold with the bobbin and the pin inserted in the mold for molding the connector housing, whereby the connector housing in the state integrated with the bobbin and integrally holding the pin can be molded.

Accordingly, when mass production of the bobbins as the common components is required, and small batches of a variety of products (i.e., manufacturing of a wide variety of products in small quantities) are required of the connector housing in accordance with the use purpose and the like, a large number of bobbins are produced by using, for example, a large number of resin molding machines, and the connector housings are molded while inserting the bobbin and the like by using a small number of resin molding machines, whereby production efficiency can be enhanced. Namely, even when small batches of variety of products are required of the entire products constituted of the bobbin and the connector housing because small batches of variety of products are produced as the connector housings, part of them can be utilized for mass production, and therefore, production efficiency can be enhanced, thereby attaining cost reduction.

According to the seventh embodiment of the present invention, the connector housing in a state integrally holding the pins by pouring the resin into a mold with the pins inserted in the mold for molding the connector housing. After the connector housing is molded, the bobbin in the state integrated with the connector housing and integrally holding the yokes by supplying the resin into a mold with the connector housing and the yokes inserted in the mold for molding the bobbin.

Accordingly, when mass production of the connector housings are required as the common products, and small batches of a variety of products are required of the bobbins in accordance with the use purpose and the like, the connector housings are produced in volume, for example, by using a large number of resin molding machines, and the bobbins are molded while inserting the connector housing or the like by using a small number of resin molding machines, whereby production efficiency can be enhanced. Namely, small batches of a variety of products are produced as the bobbins, and therefore, even when small batches of variety of products are required of the entire product constituted of the bobbin and the connector housing, part of them can be utilized for mass production, thus making it possible to enhance production efficiency, thereby realizing cost reduction.

According to the eighth and the ninth embodiments of the present invention, even when an electric current normally passes in the winding wire, and Joule heat normally occurs from the winding wire, the heat is transmitted to the yoke via the bobbin, and further transmitted to the case. The heat which occurs to the winding wire is also directly transmitted to the case, which encloses the outer periphery, as radiant heat. Then, the heat, which is transmitted to the case, can be released to the motor installation member on which the flange abuts via the flange of the case.

Since heat release performance of the heat occurring to the winding wire can be enhanced as a result, the temperature rise of the winding wire itself can be reduced, and therefore, insulation failure by the insulation coating of the winding wire being melted can be prevented, thermal deformation of the winding wire, the bobbin, the yoke, the housing and the like can be prevented. In addition, since the temperature of the winding wire lowers, there is no possibility of occurrence of thermal demagnetization to the magnet of the rotor in close vicinity to the winding wire, and characteristics of the motor such as torque can be prevented from deteriorating.

Accordingly, the problems such as insulation failure, thermal deformation and characteristics deterioration of the motor caused by high temperature of the winding wire can be prevented.

According to the ninth embodiment of the present invention, the bobbin around which the winding wire is wound, the yoke and the case are integrally connected by the resin, and therefore, the rigid stator including the winding wire, the bobbin, the yoke and the case can be constructed.

Even when the periphery and the like of the case are covered with the above described resin, the abutting surface on the motor installation member in the flange is exposed, and the heat occurring to the winding wire via the flange can be released to the motor installation member, thus making it possible to prevent heat from staying at the winding wire and the periphery of the winding wire.

Accordingly, even when the bobbin, the yoke and the case are integrally connected by the resin, the problems such as insulation failure, thermal deformation, characteristics deterioration of the motor and the like caused by high temperature of the winding wire can be prevented.

According to the tenth embodiment of the present invention, heat generating at the winding wire is transmitted to the yoke via the bobbin and directly transmitted to the yoke as the radiant heat. Then, the heat transmitted to the yoke is transmitted to the heat release means in close contact with the yoke, and further released to the motor installation member via the flange of the heat release means.

Accordingly, the heat release performance of the heat generating at the winding wire is enhanced, and therefore, even if the yoke and the periphery of the heat release means an the like are covered with the above described resin, the problems such as insulation failure, thermal deformation, and motor characteristics deterioration caused by high temperature of the winding wire can be prevented as in the above described eighth or the ninth embodiment.

In addition, the bobbin around which the winding wire is wound, the yoke and the heat release means are integrally connected by the resin, and therefore, a firm stator including the winding wire, the bobbin, the yoke and the heat release means can be constructed.

According to the eleventh embodiment of the present invention, the recessed portion is provided at the outer peripheral edge of the planar part in the yoke, and the connecting recessed portion which is pushed into the above described recessed portion in the state in which the cylindrical part is fitted onto the above described outer peripheral edge is provided at the cylindrical part in the case, thus making it possible to reliably bring the inner peripheral surface of the cylindrical part into close contact with the outer peripheral edge of the planar part.

Namely, even if a little gap in fitting exists between the outer peripheral edge of the planar portion and the inner peripheral surface of the cylindrical part in the state in which the cylindrical part is fitted onto the outer peripheral edge of the planar part, the length of the cylindrical part in the circumferential direction can be reduced by pushing a part of the cylindrical part into the recessed portion of the planar part as the connecting recessed portion, whereby the inner peripheral surface of the cylindrical part can be brought into close contact with the outer peripheral edge of the planar part. In this case, the connecting recessed portion can be also brought into close contact with the recessed portion of the planer part.

In addition, since the connecting recessed portion is engaged in the recessed portion of the planar part, close contact state of the inner peripheral surface of the cylindrical part and the outer peripheral edge of the planar part can be reliably maintained, and the yoke and the case can be firmly connected with each other.

Accordingly, leakage of the magnetic force line in the border portion of the yoke and the case can be prevented as much as possible, efficiency of the stepping motor can be enhanced, and the yoke and the case can be firmly connected.

Since the portion corresponding to the outer peripheral edge of the planar part in the cylindrical part can be reduced in diameter by the connecting recessed part, the diameter of the inner peripheral surface of the cylindrical part can be sufficiently reduced with respect to the diameter of the outer peripheral edge of the planar part, and the inner peripheral surface of the cylindrical part can be firmly brought into close contact with the outer peripheral edge of the planar part. Namely, as compared with the conventional one (see FIG. 36) in which the cylindrical part is brought into close contact with the outer peripheral edge of the planar part by forming the recessed portion at the portion away from the planar part in the cylindrical part, the inner peripheral surface of the cylindrical part can be reliably brought into a close contact with the outer peripheral edge of the planar part.

Accordingly, the space between the winding wire and the case can be made large even after the connecting recessed portion is formed, and therefore, the withstand voltage resistance between the winding wire and the case can be maintained at a sufficiently high state. Then, in the prior art, in order to maintain the above described withstand voltage resistance at a specified value or larger, the number of windings of the winding wire is reduced, or the diameters of the outer peripheral edge of the planar part and the inner peripheral surface of the cylindrical part are increased, but such things do not have to be done in the present invention, and therefore, occurrence of the harmful effects of reducing torque of the stepping motor caused by reduction in the number of windings of the winding wire and of increasing in size of the stepping motor caused by increase in the diameters of the outer peripheral edge of the planar part and the inner peripheral surface of the cylindrical part can be prevented.

According to the twelfth and the thirteenth embodiments of the present invention, the abrasion reduction/axial direction locking member exhibits both the functions that are abrasion reducing function and the axial direction locking function, and therefore, the number of components can be reduced by one as compared with the conventional stepping motor (see FIG. 39) which requires two components that are the abrasion reducing member and the axial direction locking member. In addition, the abrasion reduction/axial direction locking member is mounted to the stator side, and therefore, even if the stroke of the shaft is long and extended, the cylindrical part of the abrasion reduction/axial direction locking member does not have to be made long in accordance with the extended length unlike the conventional stepping motor in which the abrasion reduction member is mounted to the valve body side, thus making it possible to reduce the material cost of the stepping motor. In addition, since the abrasion reduction/axial direction locking member is mounted to the stator side, only the shaft is integrally molded in the molding process step of the controlled body, and therefore, as compared with the conventional stepping motor in which the abrasion reduction member and the axial direction locking member have to be integrally molded other than the shaft, time required for molding the controlled body can be shortened, thus making it possible to reduce the manufacturing cost of the stepping motor.

According to the thirteenth embodiment of the present invention, occurrence of such accident that the fluid flowing in the valve, which is opened and closed by advance and retreat of the controlled body, for example, enters the stator through the gap between the abrasion reduction/axial direction locking member and the controlled body can be restrained.

BRIEF DESCRIPTION OF THE DRAWINGS

FIG. 39A is a front sectional view showing one example of a conventional stepping motor with respect to the same stepping motor; and FIG. 39B is a view showing one example of the conventional stepping motor with respect to the same stepping motor, and is a sectional view taken along the line B to B in FIG. 39A.

Figure 1:
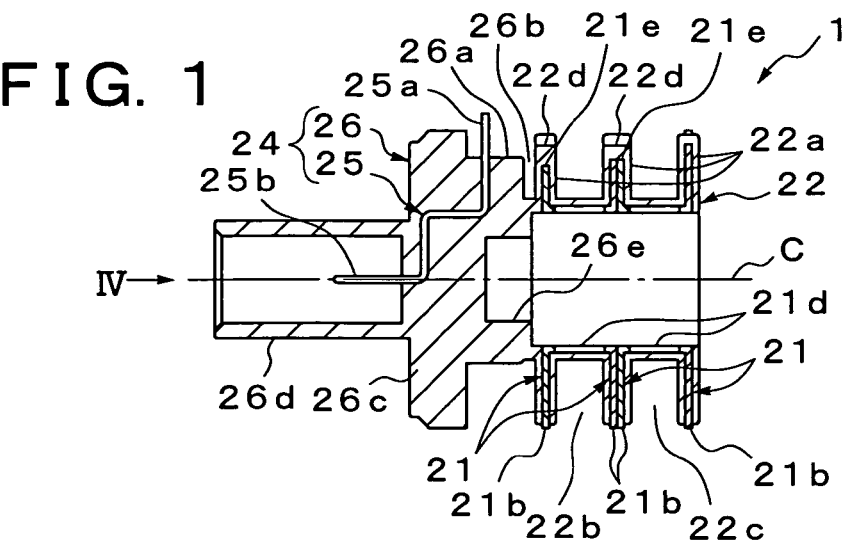
FIG. 1 is a sectional view showing a bobbin and connector housing of a stepping motor according to a first embodiment of the present invention.

DESCRIPTION OF THE SYMBOLS 1 stepping motor
21 yoke
21b outer peripheral edge
22 bobbin
22a flange part
23 coil (winding wire)
25 pin
25a terminal part
25c connecting portion
26 co nnector housing
26a terminal installation surface
26b auxiliary bobbin part
100 valve body (motor installation member)
101 installation surface
A21 coil (winding wire)
A22 bobbin
A23 yoke, first yoke (yoke)
A23d outer peripheral edge
A24 case
A24b, A26b flange
A24e heat transmission surface (abutting surface)
A25, 27 housing
A26 heat release means
A230 second yoke (yoke)
B4 case
B21 yoke (magnetic pole plate)
B21b outer peripheral edge
B21c hollow disk part (planar part)
B21d pole tooth (magnetic pole part)
B21f recessed portion
B22 bobbin
B23 coil (winding wire)
B41 peripheral wall part (cylindrical part)
B41a connecting recessed portion
C2 stator
C2a rotation restricting part
C3 shaft
C5 valve body (controlled body)
C5a rotation restricted part
C5b skirt part
C9 abrasion reduction/axial direction locking member
C9a cylindrical part
C9b flange part

BEST MODE FOR CARRYING OUT THE INVENTION

First Embodiment

A first embodiment as the best mode for carrying out the present invention will be described with reference to FIGS. 1 to 13.

Figure 12:
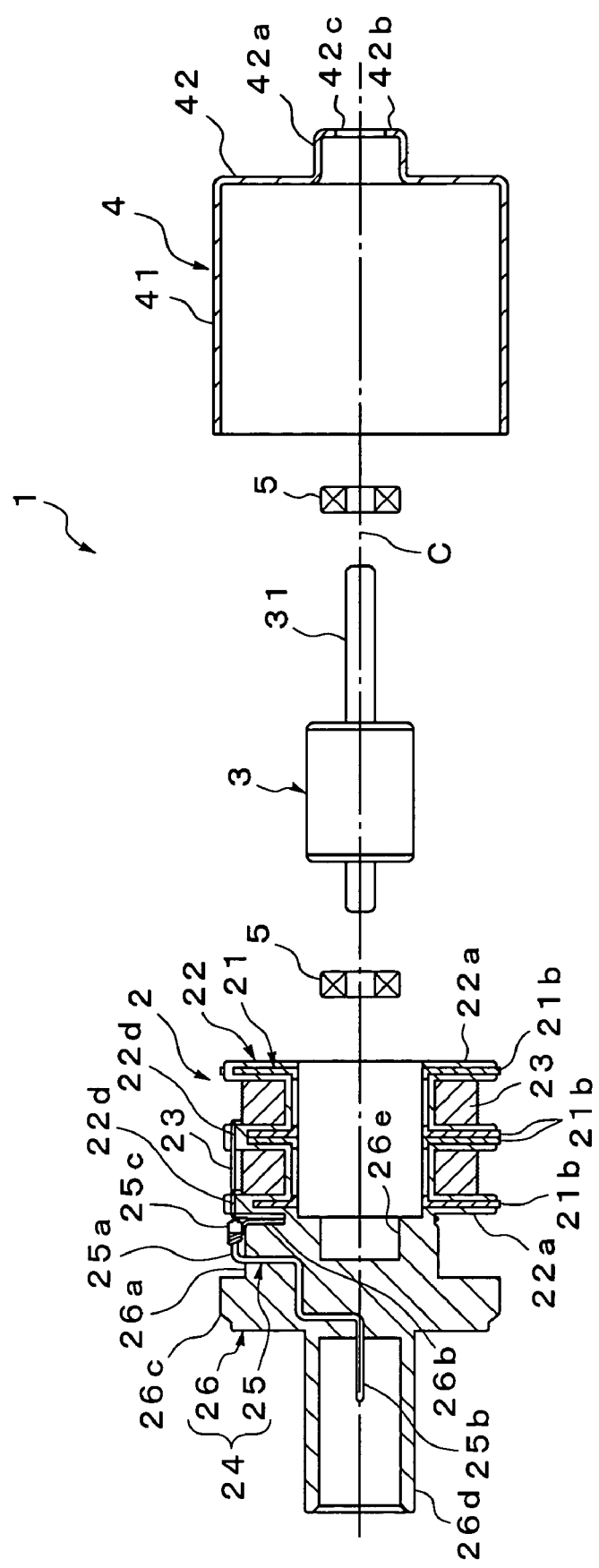
FIG. 12 is an exploded sectional view of the same stepping motor.
Figure 13:
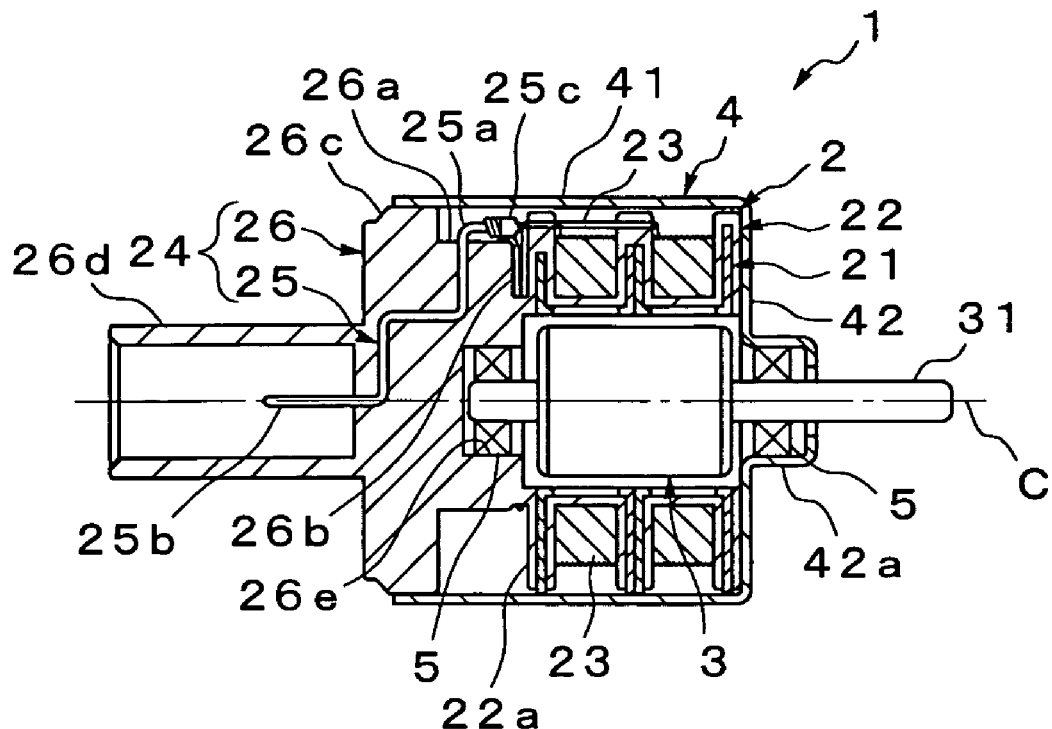
FIG. 13 is a sectional view of the stepping motor.

A stepping motor 1 shown in this first embodiment has a construction including a stator 2, a rotor 3, a case 4, a pair of ball bearings (bearing) 5, which holds a shaft 31 disposed at an axial center portion of the rotor 3, rotatably with respect to the stator 2 and the case 4, as shown in FIGS. 12 and 13.

The stator 2 includes a plurality of yokes 21 for constructing a magnetic circuit, a resin bobbin 22 which integrally holds these yokes 21, a coil (winding wire) 23 which is wound around the bobbin 22, and a connector 24 disposed at one end portion in the axial direction of the bobbin 22. The connector 24 has a construction including a plurality (6 in this embodiment) of pins 25 for connecting the coil 23 which is wound around the bobbin 22 to a female contact (external conductor) not shown, and a resin connector housing 26 which integrally holds these pins 25.

Figure 5A:
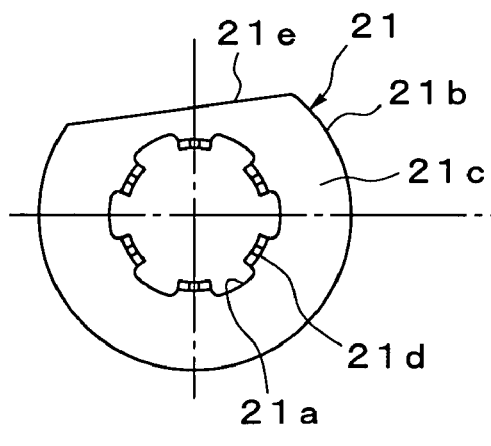
FIG. 5A is a front view showing a yoke of the same stepping motor.
Figure 5B:
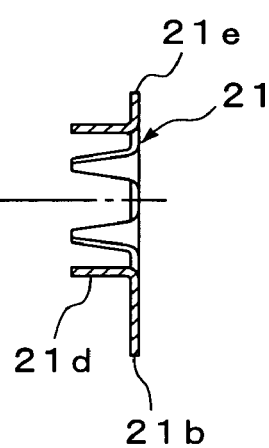
FIG. 5B is a side sectional view showing the yoke of the same stepping motor.

The yoke 21 has a hollow disk portion 21c in which a circular inner peripheral edge 21a and outer peripheral edge 21b are coaxially formed, has a plurality of (6 in this embodiment) pole teeth 21d formed to be bent in an axial direction from the inner peripheral edge 21a of the hollow disk portion 21c, and has a notch portion 21e which is formed by linearly notching a part of the outer peripheral edge portion 21b, as shown in FIGS. 5A and 5B.

Figure 2:
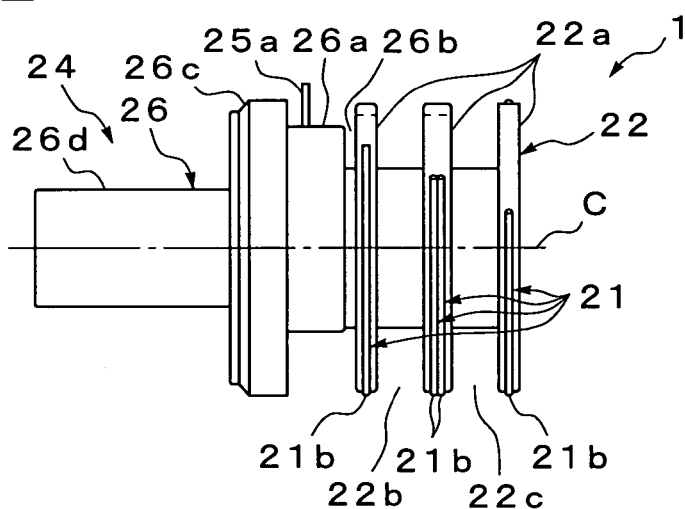
FIG. 2 is a front view showing the bobbin and the connector housing of the same stepping motor shown by FIG. 1.
Figure 3:
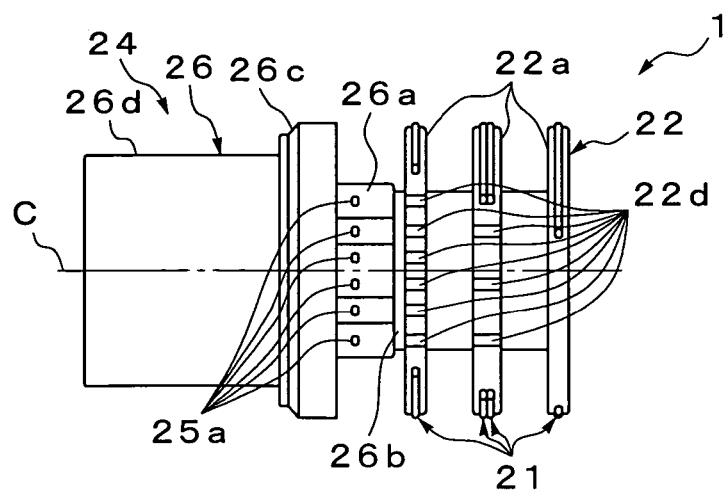
FIG. 3 is a plane view showing the bobbin and the connector housing of the same stepping motor.

As shown in FIGS. 1 to 3, four of the yokes 21 thus constructed are held by the bobbin 22 and inner peripheral surfaces of the pole teeth 21d are exposed inward to construct an inner peripheral surface of the bobbin 22. Each of the yokes 21 is disposed on the same axis, a pair of yokes 21 located at a midpoint position are in a state in which the hollow disk portions 21c are joined to each other, the part except for a circumference of each of the hollow disk portion 21c and an inner peripheral surface of each of the pole teeth 21d is covered with the resin constructing the bobbin 22, and is fixedly held by the resin.

In the bobbin 22, parts which cover the hollow disk portions 21c of the respective yokes 21 construct three flange portions 22a which project outward in a radius direction with respect to the axial direction as a center line C of the bobbin 22, and parts between the respective flange portions 22a are a first winding portion 22b and a second winding portion 22c for the coil 23. Namely, the flange portion 22a is formed to project outward in the radius direction to restrict the winding positions of the coil 23 in the axial direction. Besides, the outer peripheral edge 21b except for the notch portion 21e of each of the yokes 21 is projected from the outer peripheral edge of each of the flange portions 22a.

The connector housing 26 is integrally formed of the same resin (for example, PBT) as the bobbin 22 at one end portion in the axial direction of the bobbin 22. In the connector housing 26, a terminal installation surface 26a is formed at a position adjacent to the flange portion 22a disposed at the one end portion in the axial direction of the bobbin 22, which is a position that is inner side in the radius direction with respect to the outer peripheral edge of the flange portion 22a. The outer peripheral edge of the above described flange portion 22a corresponds to the outer peripheral edge 21b of the yoke 21.

Further, an auxiliary bobbin part 26b, which is formed at a position inside in the radius direction with respect to the terminal installation surface 26a and around which the coil 23 can be wound, is formed between the terminal installation surface 26a and the flange portion 22a adjacent to the terminal installation surface 26a.

Further, in the connector housing 26, a base disk portion 26c and a socket portion 26d are formed in sequence at a position at an opposite side from the bobbin 22 via the terminal installation surface 26a. The base disk portion 26c is formed to be coaxial with the bobbin 22, and its outer peripheral surface is formed to have the same diameter as the outer peripheral edge 21b of the yoke 21 in the bobbin 22. The socket portion 26d is formed by a cylinder with a substantially oblong section, so that an external plug not shown having the above described female contact is inserted in it.

In the pin 25, one end portion projects from the terminal installation surface 26a to be a terminal portion 25a which connects an end portion of the coil 23, and the other end portion projects into the socket portion 26d to be a male contact 25b which achieves electrical connection with the above described female contact.

Each of the terminal portions 25a projects in a direction orthogonal to the surface in the axial direction in the terminal installation surface 26a, and is disposed in a line in the circumferential direction, and each upper end projects outward in the radius direction from the outer peripheral edge 21b of the flange portion 22a in the bobbin 22 and the outer peripheral surface of the base disk portion 26c.

Besides, as shown in FIGS. 10 to 13, each terminal portion 25a is folded to the auxiliary bobbin portion 26b side to be close to the terminal installation surface 26a after the coil 23 is soldered. Namely, the terminal portion 25a is in the state in which a connecting portion 25c that is extended in diameter at the upper end portion by soldering of the coil 23, but can be folded from a root portion without bringing the entire body including the connecting portion 25c in contact with the terminal installation surface 26a. In the folded state, the entire terminal portion 25a including the connecting portion 25c is constructed to be located at a position inside in the radius direction with respect to the outer peripheral edge 21b of the flange portion 22a in the bobbin 22 and the outer peripheral surface of the base disk portion 26c. The end portion of the coil 23 is wound around the terminal portion 25a so that its tip end is located at the upper end side of the terminal portion 25a.

Besides, the above described each yoke 21 is assembled to the bobbin 22 so that the notch portion 21e is at the position corresponding to the terminal installation surface 26a. Further, on the outer peripheral edges of the two flange portions 22a located at the terminal installation surface 26a side, a plurality of grooves 22d for the coil 23 to pass through are formed at the positions corresponding to the terminal portions 25a as shown in FIG. 3.

Figure 4:
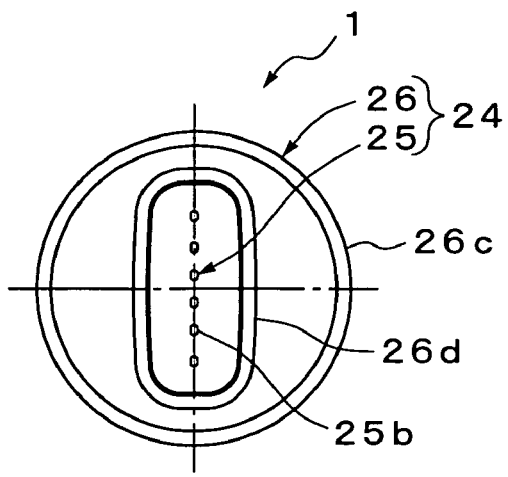
FIG. 4 is a view taken along the arrow IV in FIG. 1.

The respective male contacts 25b are disposed in a line along a longitudinal direction of a substantially oblong section in the socket portion 26d as shown in FIG. 4.

Besides, a bearing hole 26e which holds one of the above described pair of ball bearings 5 is formed at an end surface at a bobbin 22 side in the connector housing 26 as shown in FIG. 12. The bearing hole 26e is formed coaxially with the bobbin 22.

The case 4 is integrally formed by a cylindrical peripheral wall portion 41 and a planar lid body 42 which closes one end portion of the peripheral wall portion 41. The peripheral wall portion 41 is formed so that its inner peripheral surface is fitted in the outer peripheral edge 21b of the bobbin 22 and the outer peripheral edge of the base disk portion 26c, and is formed to cover the bobbin 22 and the outer peripheral surface of the base disk portion 26c of the connector housing 26 in the state in which the lid body 42 abuts on the end surface at the other end portion side of the bobbin 22.

Besides, a bearing projection portion 42a which holds the other one of the above described pair of ball bearings 5 is formed at the axial center position, and a through-hole 42c through which the shaft 31 integrated with the rotor 3 is inserted is formed at an end surface 42b of the bearing projection portion 42a. Therefore, in the state in which the bobbin 22 and the connector housing 26 are integrated, it is possible to insert the rotor 3 having the shaft 31 into the bobbin 22 and assemble the shaft 31 to rotatably support the shaft 31 by a pair of ball bearings 5.

The yoke 21 and the case 4 are formed by a magnetic body of iron or the like.

Next, a manufacturing method of the stepping motor 1 constructed as described above will be explained.

First, in order to manufacture the integrated bobbin 22 and the connector housing 26, in the state in which the above described number of yokes 21 and pins 25 are inserted in a mold not shown for molding the bobbin 22 and the connector housing 26, the same resin is continuously poured into the mold, whereby the bobbin 22 in the state integrally holding each of the yokes 21 and the connector housing 26 in the state integrally holding each of the pins 25 are integrally molded substantially simultaneously.

Figure 6:
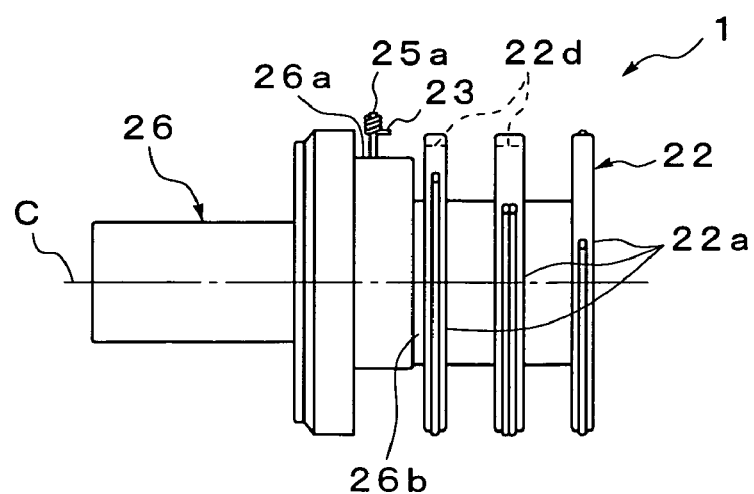
FIG. 6 is a view showing a manufacturing method of the same stepping motor, and is a front view showing a state in which an end portion of a winding wire is wound from an upper end portion of a terminal part.
Figure 7:
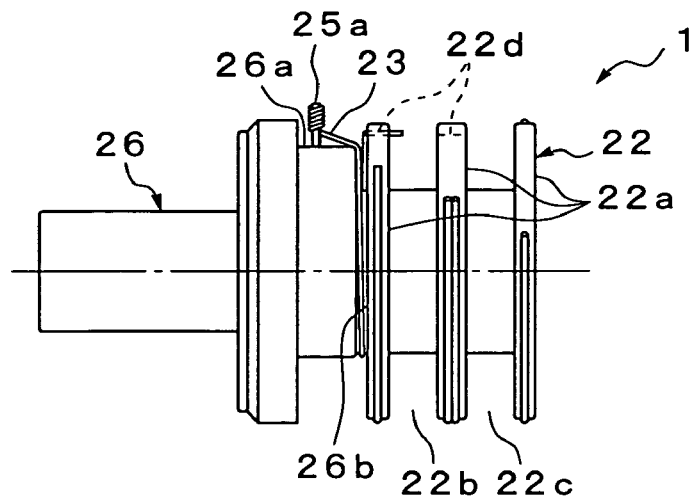
FIG. 7 is a view showing the manufacturing method of the same stepping motor, and is a front view showing a state after the winding wire is passed through a groove of a flange part after the winding wire wound around the terminal part is wound around the auxiliary bobbin part.
Figure 8:
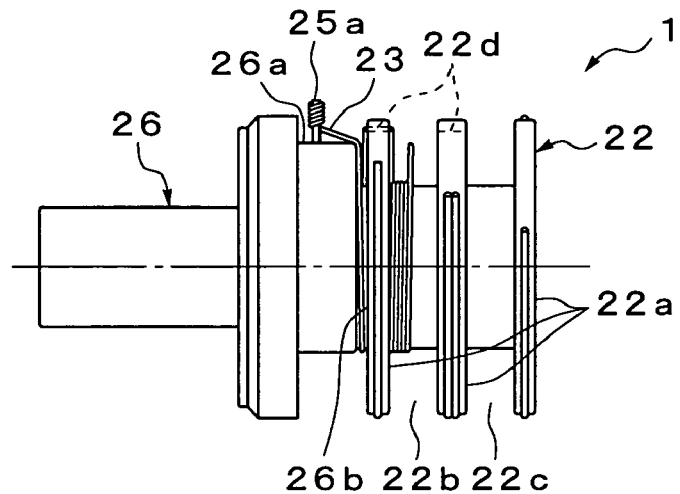
FIG. 8 is a view showing the manufacturing method of the same stepping motor, and is a front view showing a state in which after the winding wire wound around the terminal part is wound around the auxiliary bobbin part, the winding wire is passed through a groove of a flange part, and is further wound around a first winding part.
Figure 9:
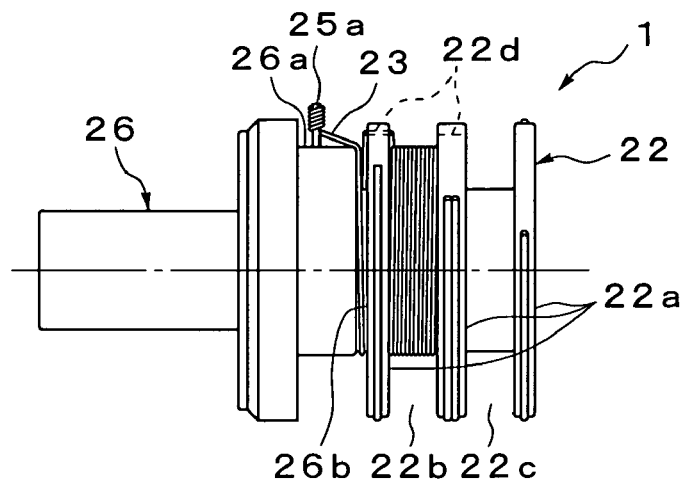
FIG. 9 is a view showing the manufacturing method of the same stepping motor, and is a front view showing a state in which after the winding wire wound around the terminal part is wound around the auxiliary bobbin part, the winding wire is passed through a groove of a flange part, and is further wound around a first winding part.

Then, as shown in FIGS. 6 and 7, the end portion of the coil 23 is wound around the terminal portion 25a from the upper end toward the root portion at the lower position, and thereafter, the coil 23 is led to the auxiliary bobbin portion 26b at the diagonally lower position from the root portion of the terminal portion 25a and wound on the auxiliary bobbin portion 26b by about one to two turns. After the coil 23 is wound on the auxiliary bobbin portion 26b by one to two turns, the end portion of the coil 23 may be wound around the terminal portion 25a from the root portion to the upper position. Then, as shown in FIGS. 7 to 9, the coil 23 wound around the auxiliary bobbin portion 26b is led to the first winding portion 22b via the groove 22d of the flange portion 22a adjacent to the auxiliary bobbin portion 26b, and is wound around the first winding portion 22b.

The coil 23 after being wound around the first winding portion 22b is led to auxiliary bobbin portion 26b via the groove 22d of the flange portion 22a again, wound around the auxiliary bobbin portion 26b by one to two turns, and is bound to be wound around another terminal portion 25a from the root portion to the tip end side.

Figure 10:
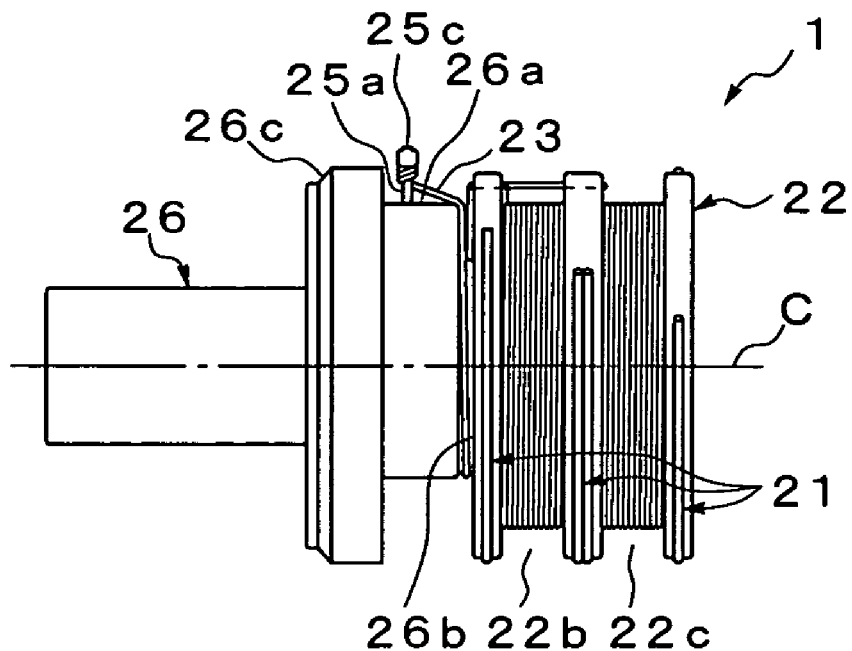
FIG. 10 is a view showing the manufacturing method of the same stepping motor, and is a front view showing a sate in which the winding wire is also wound around a second winding part, and showing a state after a connecting portion is formed at an upper end portion of the terminal part.

In this manner, the other coil 23 is also wound around a different terminal portion 25a from the above described one and wound around the auxiliary bobbin portion 26b, and is wound around the second winding portion 22c as shown in FIG. 10. Then, the end portion of the coil 23 is soldered to each of the terminal portions 25a. In this case, soldering is performed from the upper end side of the terminal portion 25a, and therefore, the connecting portion 25c with the extended diameter is formed at a tip end portion of each of the terminal portions 25a.

Figure 11:
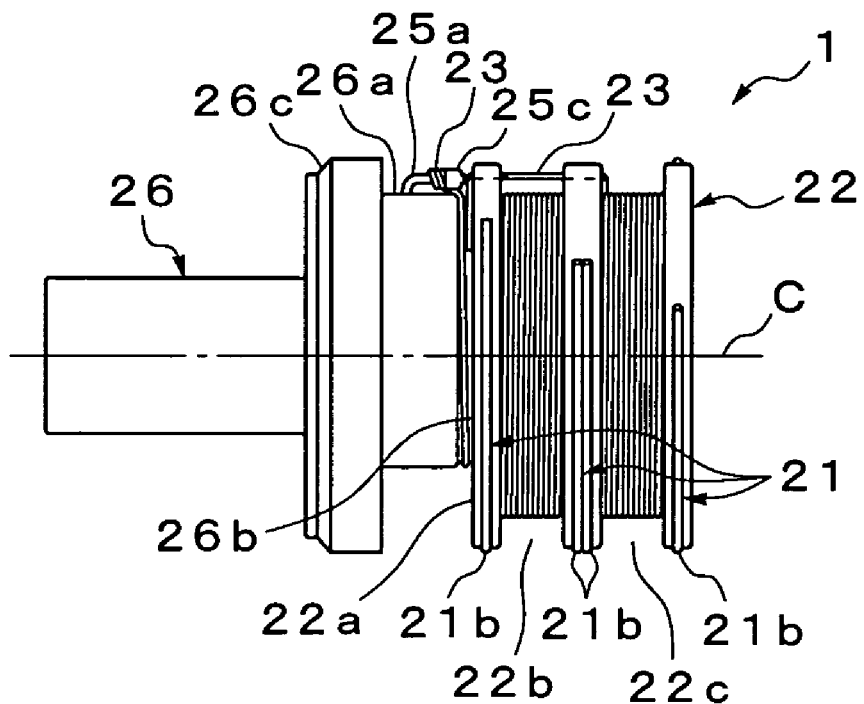
FIG. 11 is a view showing the manufacturing method of the same stepping motor, and is a front view showing a state in which the terminal part having the connecting portion is folded to be in close vicinity to a terminal installation surface.

Thereafter, each of the terminal portions 25a is folded to the auxiliary bobbin portion 26b side from its root portion as shown in FIG. 11. In this case, the entire terminal portion 25a including the connecting portion 25c is brought into close vicinity to the terminal installation surface 26a to such an extent as not to contact the terminal installation surface 26a.

Next, as shown in FIG. 12, one of the ball bearings 5 is fitted into the bearing hole 26e of the connector housing 26, and a base end portion of the shaft 31 in the rotor 3 is inserted into the ball bearing 5. Further, the case 4 with the other ball bearing 5 fitted in the bearing projected portion 42a is put on so as to cover the outer peripheries of the bobbin 22 and the connector housing 26, and the tip end portion of the shaft 31 is inserted into the other ball bearing 5 and the through-hole 42c to penetrate through them. Then, the case 4 is fixed to the ball bearing 5 and/or the connector housing 26 with fixing means such as an adhesive, welding, a screw and the like, whereby the stepping motor 1 integrally including the connector 24 is completed.

In the stepping motor 1 constructed as described above and its manufacturing method, the bobbin 22 and the connector housing 26 are integrally molded of the same resin, and therefore, the number of components and assembly steps can be reduced as compared with the conventional one in which the bobbin and the connector housing are separately included, and the bobbin and the connector housing are connected by ultrasonic welding or the like at the time of assembly.

Besides, as compared with the conventional case where the bobbin and the connector housing are connected by ultrasonic welding, there is no possibility of occurrence of causing deterioration of strength by poor welding to a connecting portion of the bobbin 22 and the connector housing 26, and thus, reliability in strength can be enhanced. Further, ultrasonic vibration of high energy does not act on the bobbin and the connector housing, and therefore, there is no possibility of occurrence of breakage to the bobbin 22 and the connector housing 26 by the ultrasonic vibration. Furthermore, an ultrasonic welding machine is generally expensive, but there is no need to use such an expensive machine, and therefore, the cost can be reduced correspondingly.

Further, by winding the coil 23 around the auxiliary bobbin portion 26b, the coil 23 is in the state in which it is stably held at the auxiliary bobbin portion 26b. Therefore, when the coil 23 is wound around the auxiliary bobbin 26b and thereafter, wound around the terminal portion 25a, the coil 23 can be easily wound around the terminal portion 25a. Besides, it becomes easy to wind the coil 23 around the first winding portion 22b and the second winding portion 22c of the bobbin 22.

Further, the coil 23 extends diagonally downward from the root portion of the terminal part 25a and is wound around the auxiliary bobbin part 26b, and therefore, even when the terminal part 25a is folded from the root portion to be along the terminal installation surface 26a after the coil 23 is soldered to the terminal part 25a, the coil 23 extending from the terminal part 25a can be prevented from being loosened as much as possible. Accordingly, the coil 23 can be prevented from being cut or coating of the coil 23 can be prevented from peeling off by the loosened coil 23 being caught between the terminal parts 25a and the connecting portion 25c and the terminal installation surface 26a, and the coil 23 at the peeled portion and the terminal part 25a or the connecting portion 25c can be prevented from being short-circuited.

Besides, after the terminal part 25a is folded, the connecting portion 25c is located at the outer peripheral edge of the flange part 22a, namely, at an inner position in the radius direction from the position corresponding to the outer peripheral edge 21b of the yoke 21, and therefore, the connecting portion 25c can be prevented from hitting the case 4 and being short-circuited.

Note that connection of the coil 23 to the terminal part 25a can be also reliably performed by welding by ark, plasma laser and the like other than the above described soldering. As for the terminal part 25a having the connecting portion 25c which occurs as a result of the welding, the terminal part 25a is located at the inner position in the radius direction with respect to the outer peripheral edge 21b of the flange part 22a by folding the terminal part 25a from its root portion to be close to the terminal installation surface 26a.

Figure 14:
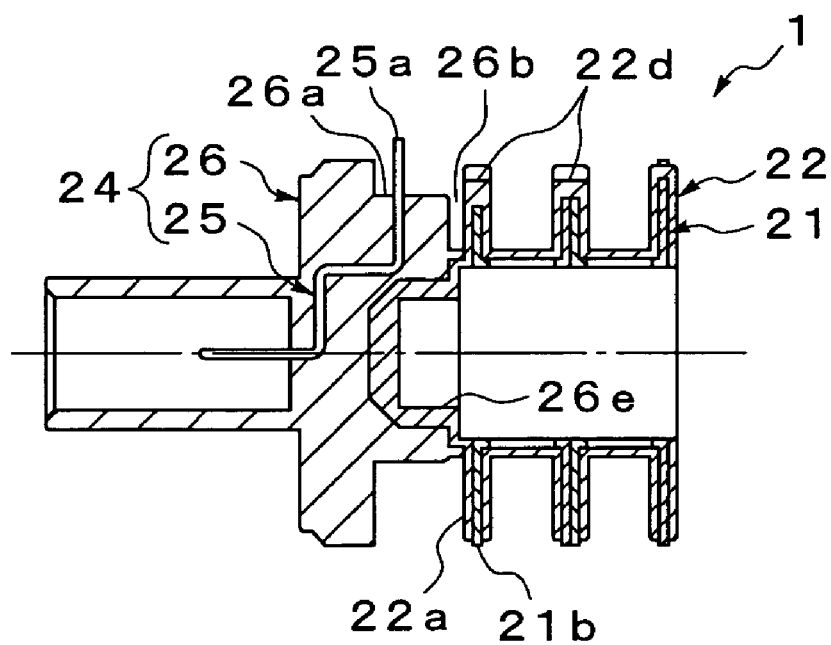
FIG. 14 is a sectional view showing an example of another manufacturing method of the bobbin and the connector housing of the same stepping motor.
Figure 15:
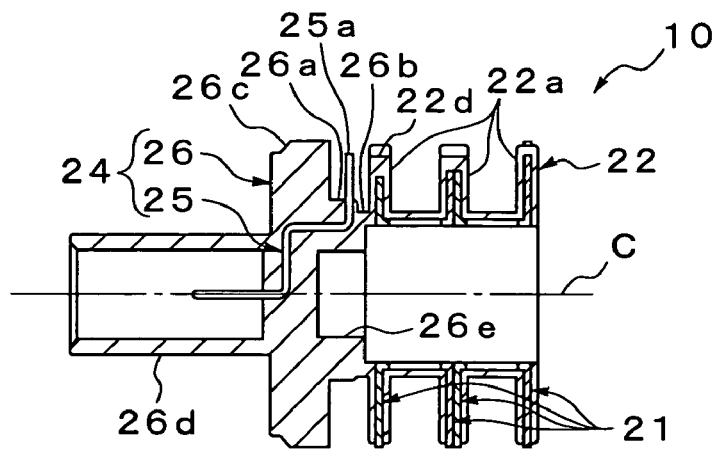
FIG. 15 is a sectional view showing the bobbin and the connector housing of a stepping motor shown as a second embodiment of the invention.
Figure 16:
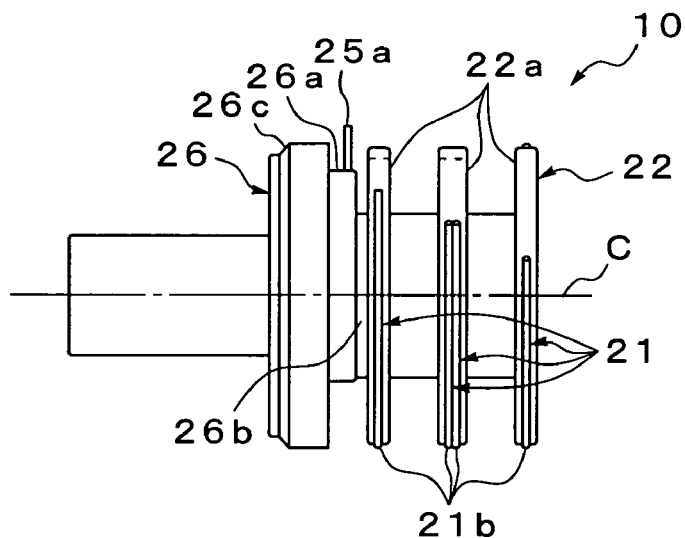
FIG. 16 is a front view showing the bobbin and the connector housing of the same stepping motor.
Figure 17:
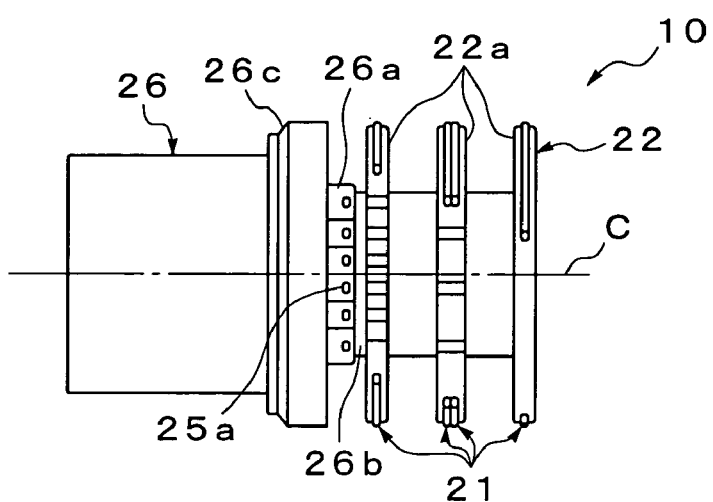
FIG. 17 is a plane view showing the bobbin and the connector housing of the same stepping motor.

Besides, in the above described first embodiment, the method of molding the bobbin 22 and the connector housing 26 substantially at the same time by continuously pouring the same resin into the molds for molding the bobbin 22 and the connector housing 26, but as shown in FIG. 14, the method of rein-molding the connector housing 26 to be integrated with the bobbin 22 after resin-molding the bobbin 22 may be used. Besides, the method of resin-molding the connector housing 26, and thereafter, resin-molding the bobbin 22 to be integrated with the connector housing 26 may be used.

Namely, as the method for resin-molding the connector housing 26 to be integrated with the bobbin 22 after resin-molding the bobbin 22, there is the method of molding the bobbin 22 in the state integrally holding each of the yokes 21 by pouring a resin into a mold with each of the yokes 21 inserted in the mold for molding the bobbin 22, for example, and thereafter, molding the connector housing 26 in the state integrated with the bobbin 22 and integrally holding each of the pins 25 by pouring the resin into a mold with the bobbin 22 and each of the pins 25 inserted in the mold for molding the connector housing 26.

In the case of this method, when mass production of bobbins 22 as the common components is required, and small batches of a variety of products are required of the connector housing 26 in accordance with the use purpose, customer and the like, a large number of bobbins 22 are produced by using, for example, a large number of resin molding machines, and the connector housings 26 are molded while inserting the bobbin 22 and the like by using a small number of resin molding machines, whereby production efficiency can be enhanced. Namely, small batches of a variety of products are produced as the connector housings 26, and therefore, even when small batches of variety of products are required of an entire product constituted of the bobbin 22 and the connector housing 26, part of them can be utilized for mass production, thus making it possible to enhance production efficiency, thereby making it possible to reduce cost.

Meanwhile, as the method for resin-molding the bobbin 22 to be integrated with the connector housing 26 after resin-molding the connector housing 26, there is the method of molding the connector housing 26 in a state integrally holding each of the pins 25 by pouring the resin into a mold with each of the pins 25 inserted in the mold for molding the connector housing 26, and thereafter, molding the bobbin 22 in the state integrated with the connector housing 26 and integrally holding each of the yokes 21 by pouring the resin into a mold with the connector housing 26 and each of the yokes 21 inserted in the mold for molding the bobbin 22.

In the case of this method, when mass production of the connector housings 26 are required as the common products, and small batches of a variety of products are required of the bobbins 22 in accordance with the use purpose, customer and the like, the connector housings 26 are produced in volume, for example, by using a large number of resin molding machines, and the bobbins 22 are molded while inserting the connector housings 26 and the like byusing a small number of resin molding machines, whereby production efficiency can be enhanced. Namely, small batches of a variety of products are produced as the bobbins 22, and therefore, even when small batches of variety of products are required of the entire product constituted of the bobbin 22 and the connector housing 26, part of it can be utilized for mass production, thus making it possible to enhance production efficiency, thereby making it possible to reduce cost.

Besides, it is preferable to mold the bobbin 22 and the connector housing 26 of the same resin even when they are molded by shifting time as described above. However, different resins may be used. In this case, the most suitable resins can be respectively used for the bobbin 22 and the connector housing 26.

DIFFERENT MODES FOR CARRYING OUT THE INVENTION

Next, a second embodiment to a sixth embodiment as the different modes for carrying out the present invention will be explained with reference to the drawings.

Second Embodiment

First, a second embodiment will be explained with reference to FIGS. 15 to 19. Note that the common components as the components shown in the above described first embodiment are given the same reference numerals and characters and the explanation thereof will be abbreviated.

The point that a stepping motor 10 shown in the second embodiment differs from the stepping motor 1 shown in the first embodiment is that the upper end of the terminal part 25a including the connecting portion 25c is constructed to be located at an inner position in the radius direction with respect to the outer peripheral edge of the flange part 22a, namely, the outer peripheral edge 21b of the yoke 21 without folding the terminal part 25a.

Namely, as shown in FIGS. 15 to 19, the terminal installation surface 26a is formed at the inner position in the radius direction with respect to the outer peripheral edge of the flange part 22a, and therefore, the terminal part 25a is formed so that the upper end of the terminal part 25a including the connecting portion 25c does not project upward from the outer peripheral edge of the flange part 22a.

Besides, since the terminal part 25a does not need to be folded, the terminal installation surface 26a is formed to be shorter in length in the axial direction than the one shown in the first embodiment by the length that is needed for folding.

Figure 18:
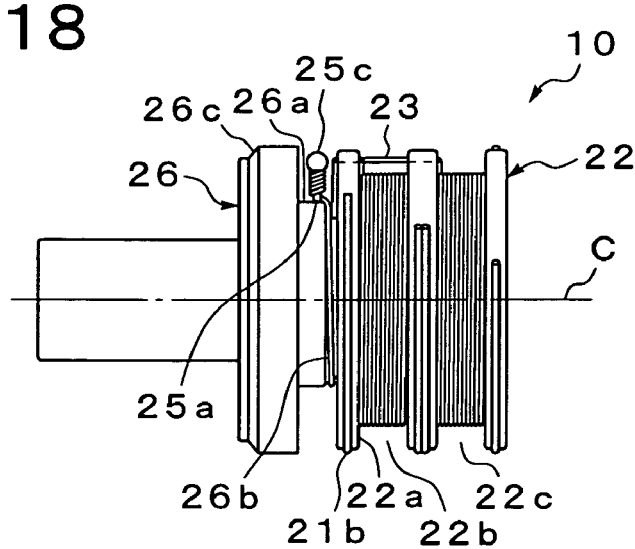
FIG. 18 is a front view showing a state after a winding wire is placed in a regular state in the bobbin and the connector housing of the same stepping motor and a connecting portion is formed at an upper end portion of the terminal part.
Figure 19:
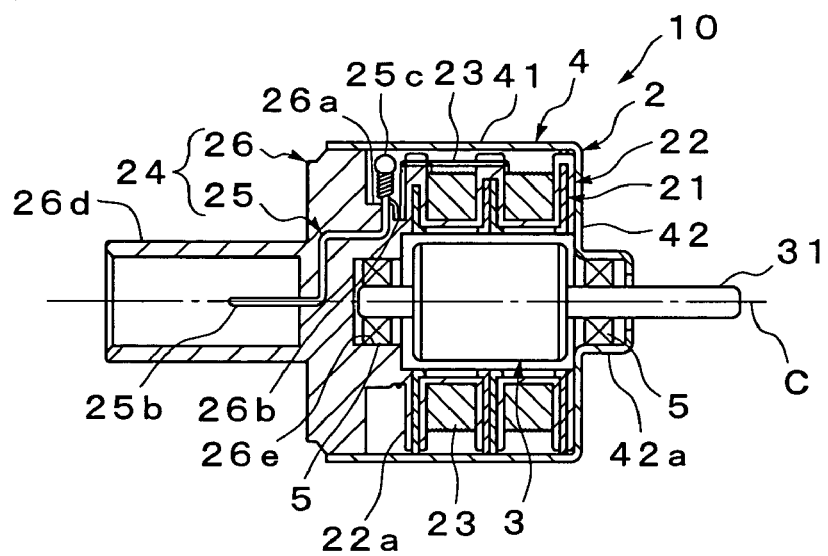
FIG. 19 is a sectional view of the same stepping motor.

Then, the connecting portion 25c to the coil 23 in the terminal part 25a is formed at the upper end portion of the terminal part 25a by being arc-welded from the upper end side of the terminal part 25a, as shown in FIGS. 18 and 19.

In the stepping motor 10 constructed as described above, the upper end of the terminal part 25a including the connecting portion 25c is located at the inner position in the radius direction from the outer peripheral edge of the flange part 22a of the bobbin 22, and therefore, it is not necessary to fold the terminal part 25a along the terminal installation surface. Accordingly, the number of steps required for folding the terminal part 25a can be reduced.

In addition, the length in the axial direction of the terminal installation surface 26 can be shortened by the space length required for folding the terminal part 25a, and therefore, the stepping motor 10 can be made compact.

Note that in the above described second embodiment, the terminal portion of the coil 23 is connected to the terminal part 25a by arc welding, but it can be also reliably connected by the other welding such as plasma, laser and the like. If possible, the coil 23 may be connected to the terminal part 25a by soldering.

Figure 20:
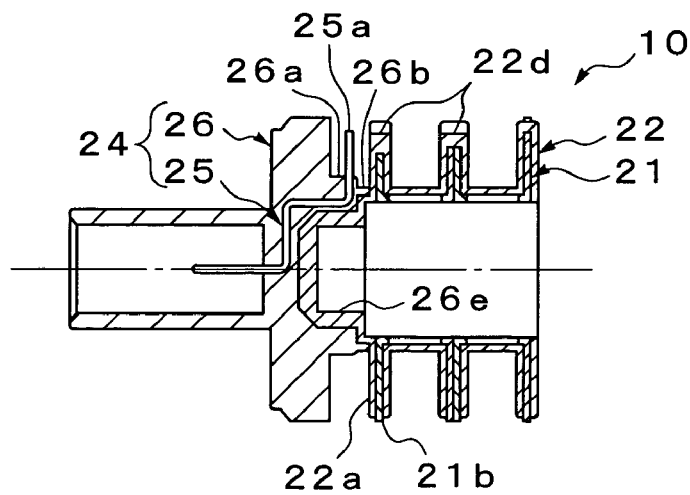
FIG. 20 is a sectional view showing an example of another manufacturing method of the bobbin and the connector housing of the same stepping motor.

Besides, in the above described second embodiment, the method of resin-molding the connector housing 26 to be integrated with the bobbin 22 after resin-molding the bobbin 22 as shown in FIG. 20 may be used, or the method of resin-molding the bobbin 22 to be integrated with the connector housing 26 after resin-molding the connector housing 26 may be used. However, the details of these methods are the same as the content shown in FIG. 14, and therefore, the explanation thereof will be omitted.

Third Embodiment

Next, a third embodiment of the present invention will be described with reference to FIGS. 21 to 26.

Figure 21:
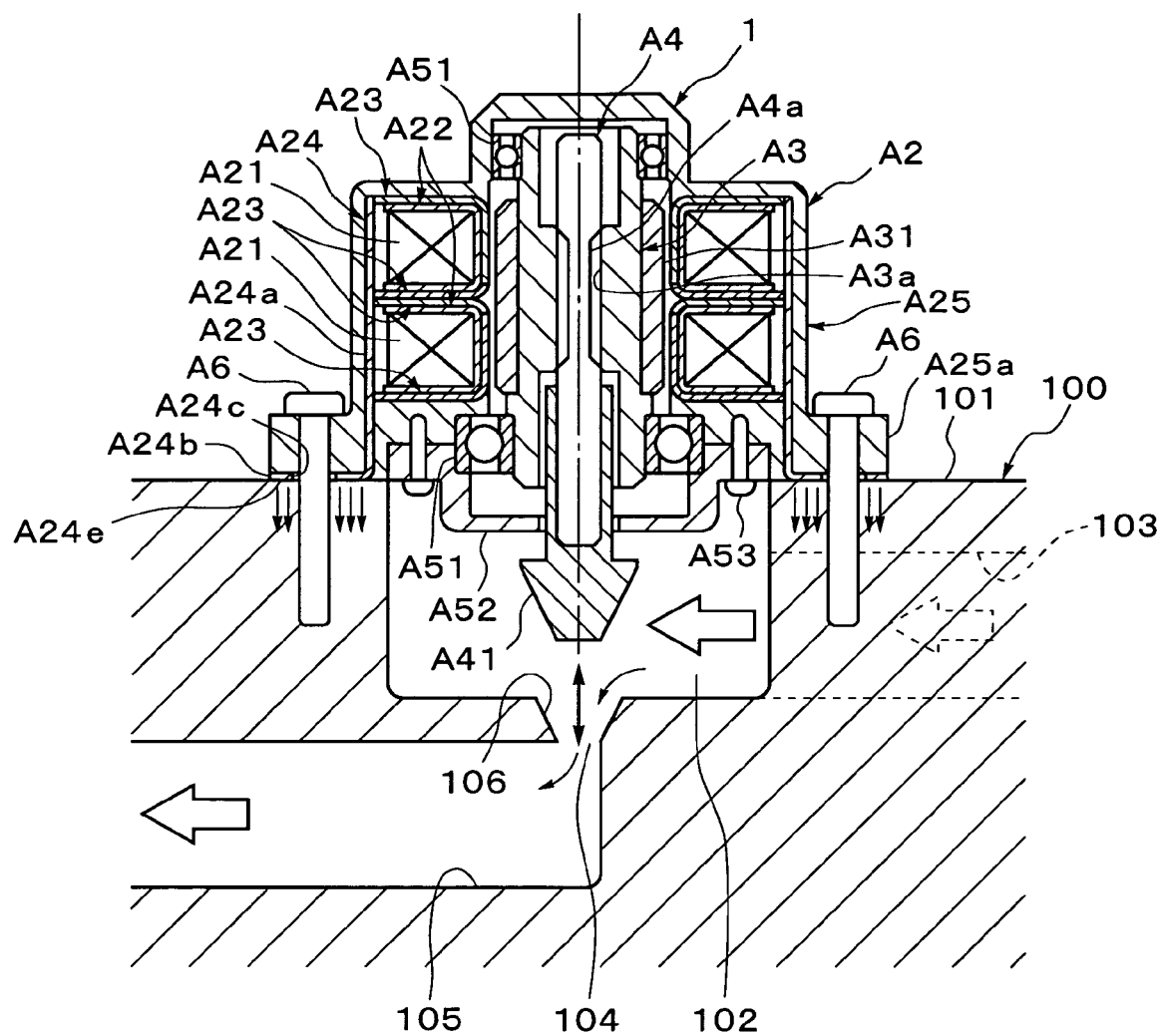
FIG. 21 is a sectional view showing a flow control valve including a stepping motor shown as a third embodiment of the present invention.

A stepping motor shown in the third embodiment is mounted on a valve body (motor installation member) 100 to construct a flow control valve which adjusts a flow of a mixture gas in a gasoline engine as shown in FIG. 21. Note that the flow control valve controls an idling speed.

The valve body 100 is integrally formed of aluminum, has a planar installation surface 101 on which the stepping motor 1 is mounted, and has a flow control chamber 102 formed into a recessed shape with respect to the installation surface 101. An inflow passage 103 for a mixture gas communicates with the flow control chamber 102, and an outflow passage 105 communicates with it via a valve port 104. The valve port 104 is formed to open to a bottom surface of the flow control chamber 102, and a valve seat 106 is formed at an end portion of the bottom surface side. Further, the valve body has an opening from the flow control chamber 102 to an outer surface of the valve body 100, and the stepping motor 1 is connected to the valve body 100 to seal the above described opening tightly to prevent leakage of the mixture gas.

The stepping motor 1 has a construction including a stator A2, a rotor A3 and an output shaft A4.

Figure 25:
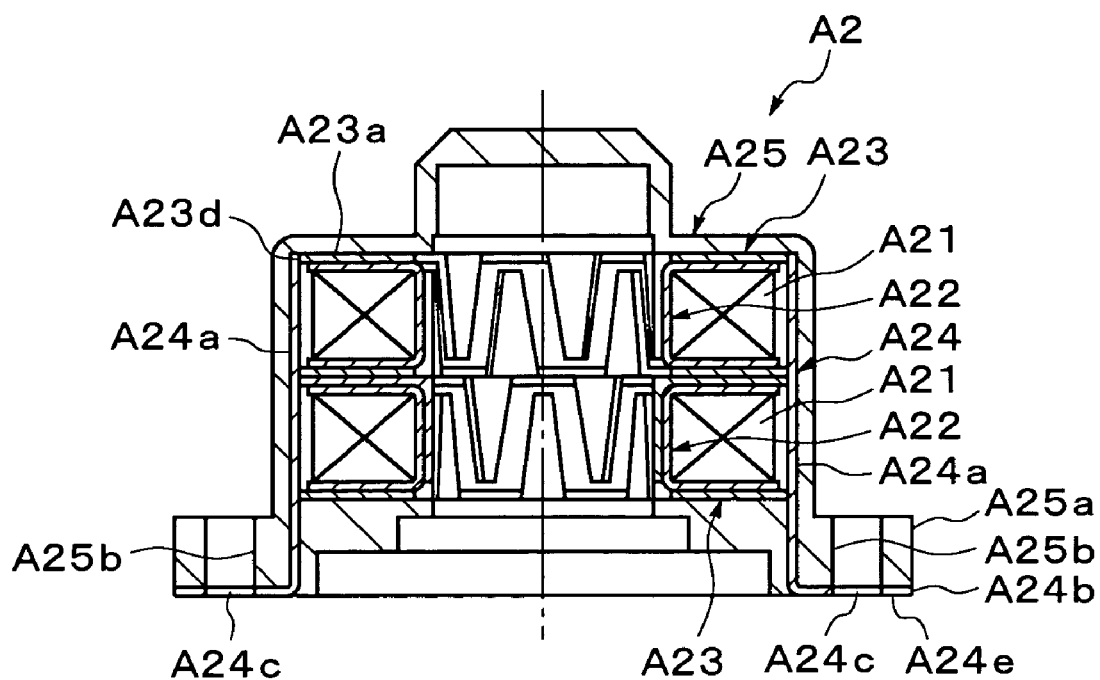
FIG. 25 is a sectional view showing a stator including the coil, bobbin, yoke, case and housing in the same stepping motor.

As shown in FIG. 25, the stator A2 includes a coil (winding wire) A21, a bobbin A22 around which the coil A21 is wound, a yoke A23 which is provided to be along an end surface in an axial direction of the bobbin A22 from an inner peripheral surface of the bobbin A22, a case A24 which is formed into a cylindrical shape to enclose outer peripheral sides of the yoke A23, the bobbin A22 and the coil A21, is in close contact with an outer peripheral edge A23*d* (See FIGS. 22A, 22B and 23) of a hollow disk part (flat part) A23*a* along an end surface in the axial direction of the bobbin A22 in the yoke A23 and constructs a magnetic circuit with the yoke A23, and a housing A25 which is molded of a resin to integrally connect the case A24, the bobbin A22 having the coil A21 and the yoke A23.

Figure 23:
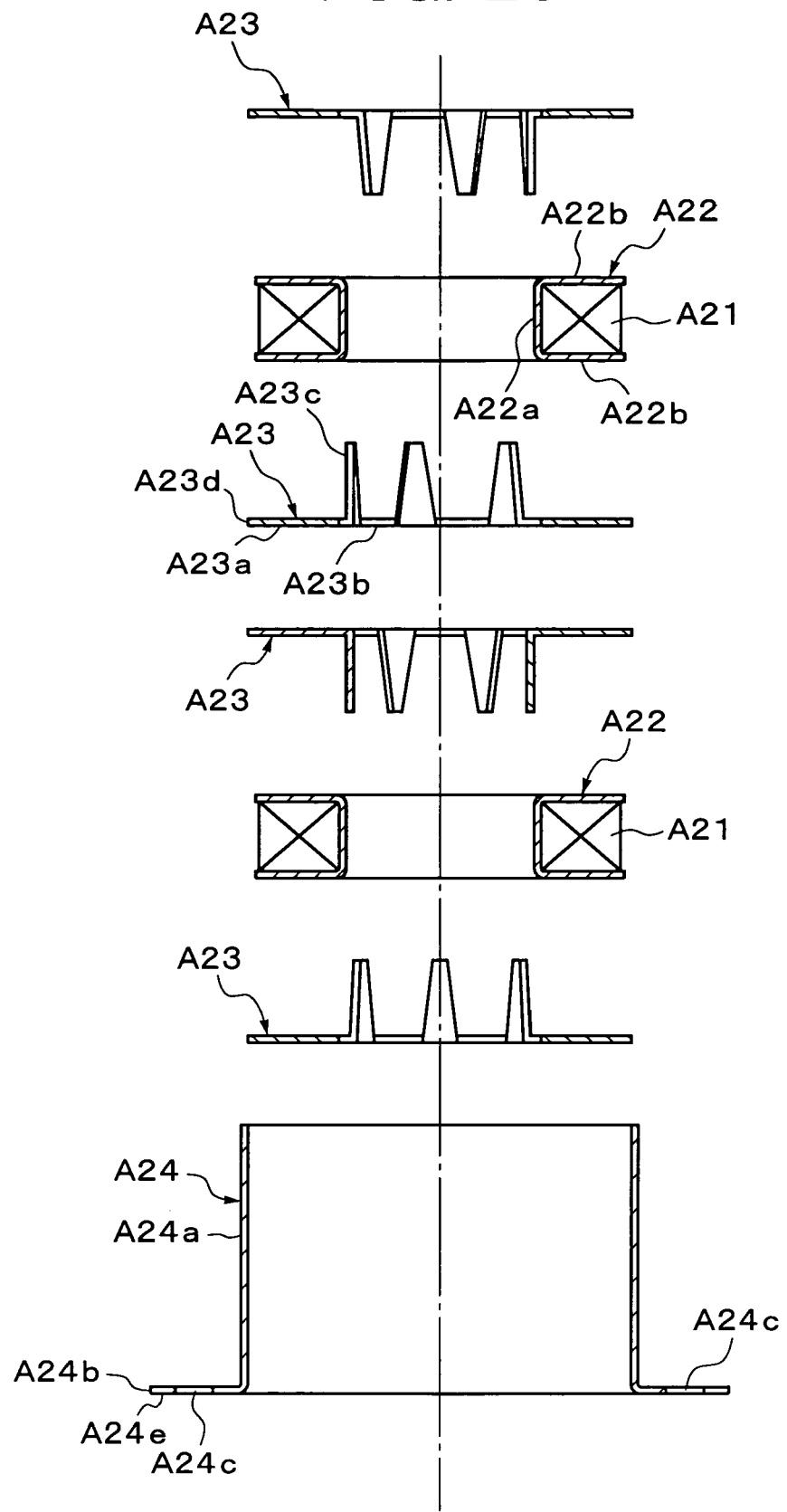
FIG. 23 is an exploded sectional view of a bobbin having a coil, the yoke and the case in the same stepping motor.

As shown in FIG. 23, the bobbin A22 is integrally formed by a cylindrical part A22*a*, flange parts A22*b* and A22*b* which extend annularly outward in a radius direction from each end portion in an axial direction of the cylindrical part A22*a*. Meanwhile, the coil A21 is wound around a portion between the respective flange parts A22*b* in the cylindrical part A22*a*.

Figure 22A:
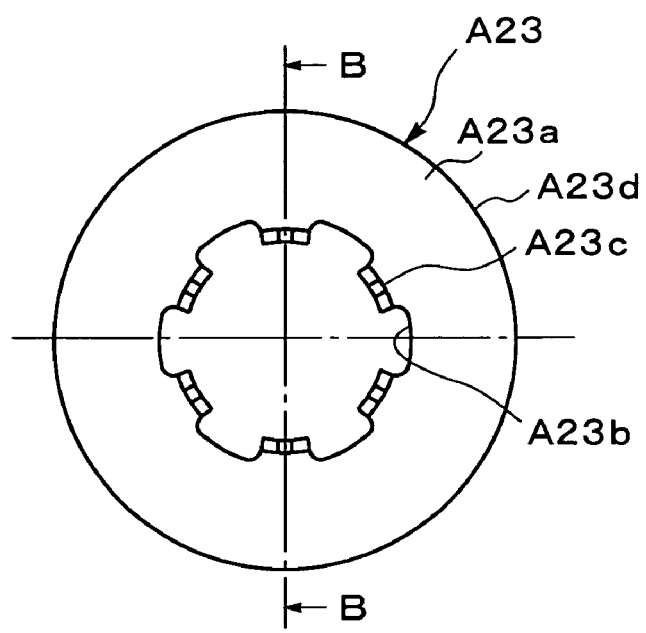
FIG. 22A is a front view showing the yoke of the same stepping motor.
Figure 22B:
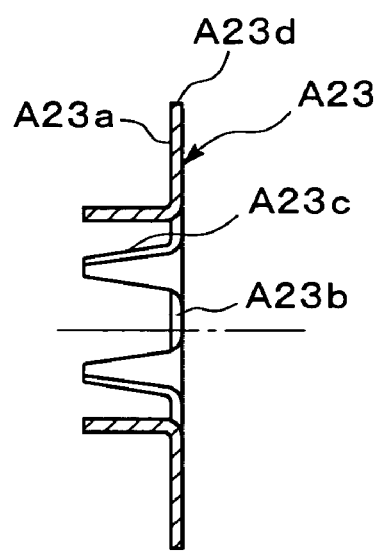
FIG. 22B is a view showing the yoke of the same stepping motor, and is a sectional view along the line B to B in FIG. 22A.

As shown in FIGS. 22A, 22B and 23, the yoke A23 is formed by a magnetic plate such as an iron plate, and is in a shape having a plurality (six in this embodiment) of pole teeth A23*c* which are molded to be bent in the axial direction from an inner peripheral edge A23*b* of the hollow disk part A23*a*. Besides, the circular outer peripheral edge A23*d* of the hollow disk part A23*a* is formed to have a larger diameter than a circular outer peripheral edge of the flange part A22*b* in the bobbin A22.

Figure 24:
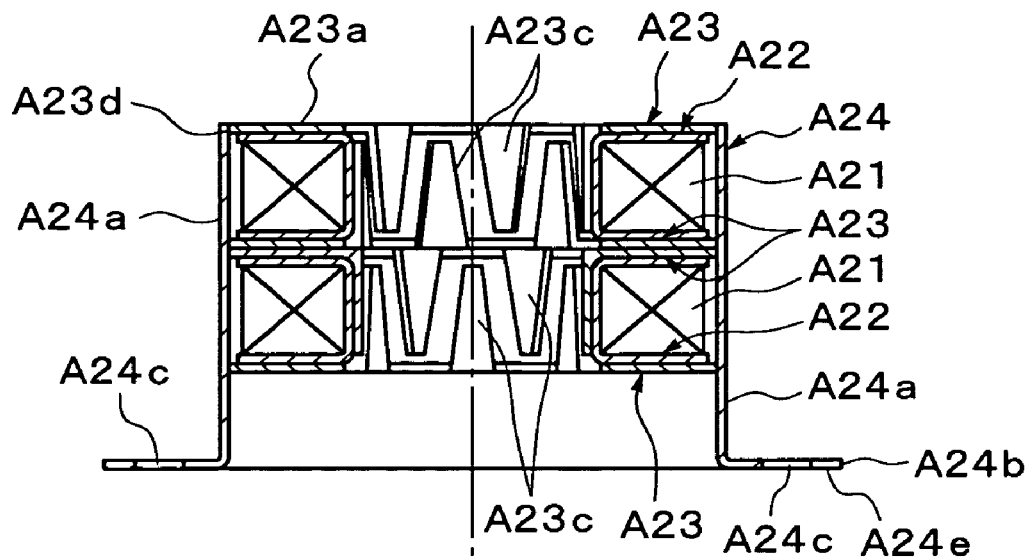
FIG. 24 is a sectional view showing a state in which the bobbin having the coil and the yoke are assembled to the case in the same stepping motor.

As shown in FIGS. 23 to 25, the yokes A23 thus constructed are placed to sandwich the bobbin A22 from both sides in the axial direction by fitting an outer peripheral surface of each of the pole teeth A23*c* in an inner peripheral surface of the cylindrical part A22*a* of the bobbin A22 and by bringing the hollow disk parts A23*a* into close contact with the flange parts A22*b* which construct the end surfaces in the axial direction of the bobbin A22. The outer peripheral edge A23*d* of the hollow disk part A23*a* is formed to have a larger diameter than the outer peripheral edge of the flange part A22*b*, and therefore, the outer peripheral edge A23*d* is located at an outer side in the radius direction from the outer peripheral edge of the flange part A22*b*.

Then, a first stator constituted of the bobbin A22 having the coil A21 and a pair of yokes A23 is inserted into the case A24 in the state in which it is coaxially superimposed on a second stator which is similarly constructed.

As shown in FIG. 23, the case A24 is formed by a magnetic substance such as iron, and is integrally formed by a cylindrical part A24*a* fitted on the outer peripheral edge A23*d* of each yoke A23, and a flange A24*b* which extends annularly outward in the radius direction from one end portion of the cylindrical part A24*a* and is connected to the installation surface 101 of the valve body 100. Through-holes A24*c* through which bolts A6 (See FIG. 21) are inserted are formed equidistantly in a circumferential direction in the flange A24*b*.

The case A24 has its outer peripheral surface reliably brought into close contact with the outer peripheral edge A23*d* of each of the yokes A23 by reducing the diameter of the cylindrical part A24*a* with the above described first and second stators inserted therein as shown in FIG. 24.

As shown in FIG. 25, the housing A25 is integrally formed by being molded of a resin to cover the outer peripheral side of the case A24 in which the first and the second stators shown in FIG. 24 are assembled and one end surface side, the other end surface side and the like in the axial direction of the layered first and second stators, and the bobbin A22 having the coil A21 and the yoke A23 and the case A24 are integrally connected by the resin molding. However, a surface, which abuts on the installation surface 101 of the valve body 100, in the flange A24*b* becomes a heat-transfer surface (abutment surface) A24*e* where the resin constructing the housing A25 is removed and a metal surface is exposed. Namely, in the flange A24*b*, the heat-transfer surface A24*e* directly abuts on the installation surface 101. A surface (top surface) at an opposite side from the heat-transfer surface A24*e* in the flange A24*b* is covered with a flange part A25*a* made of the resin which constructs the housing A25, and a through-hole A25*b* having the same diameter as the through-hole A24*c* is coaxially formed at the position, which corresponds to the through-hole A24*c* of the flange A24*b*, in the flange part A25*a*.

Figure 26:
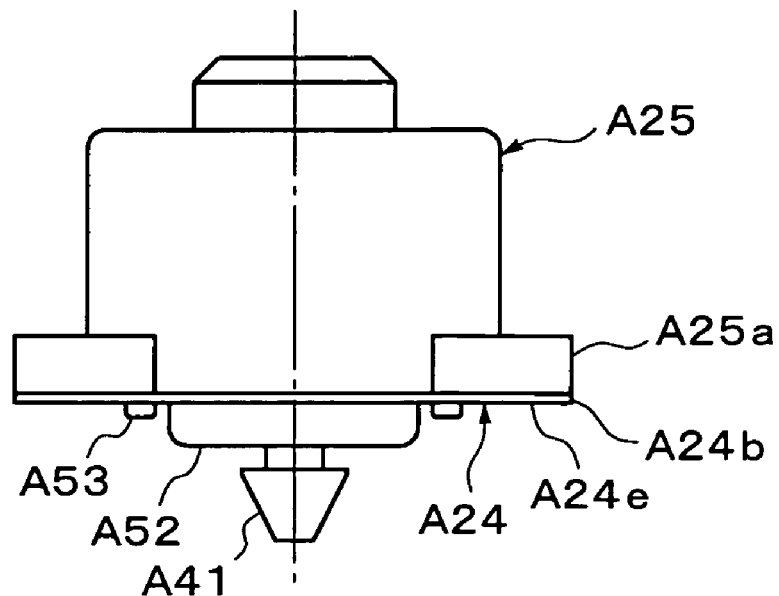
FIG. 26 is a front view showing an outer appearance of the same stepping motor.

The housing A25 is in the shape having hermeticity to prevent leakage of a mixture gas when the stepping motor 1 is connected to the opening from the flow control chamber 102 to the outer side surface of the valve body 100. Namely, the housing A25 is formed to completely cover the top surface of the flange A24*b* in the case A24, the outer peripheral surface of the cylindrical part A24*a* and the opening at the opposite side from the flange A24*b* in the axial direction of the cylindrical part A24*a* as shown in FIGS. 25 and 26.

Meanwhile, the rotor A3 is formed into a cylindrical shape as shown in FIG. 21, and both end portions in its axial direction are rotatably supported at the housing A25 via a ball bearing A51. On the outer peripheral surface of the rotor A3, a magnet A31 is provided in close vicinity to the pole teeth A23c of each yoke A23, and a female thread A3a is formed on its inner peripheral surface.

The output shaft A4 has a male thread A4a, which screws into the female thread A3a of the rotor A3, formed on its outer peripheral surface, and moves in the axial direction with the rotation of the rotor A3. A valve body A41, which is formed of a seal member of a resin or the like, is integrally molded at one end portion side in the axial direction in the output shaft A4. The output shaft A4 is disposed axially with the valve port 104 in the state in which the stepping motor 1 is fixed to the installation surface 101 of the valve body 100 by the bolts A6, and by moving in the axial direction, it adjusts the opening degree of the valve port 104 by the valve body A41.

The bolt A6 is inserted through the through-hole A25b of the flange part A25a in the housing A25 and the through-hole A24c of the flange A24b in the case A24, and the bolt A6 is screwed into the screw hole formed in the installation surface 101 of the valve body 100 and fastened, whereby the heat-transfer surface A24e of the flange A24b is reliably brought into close contact with the installation surface 101, and the stepping motor 1 is reliably fixed to the valve body 100.

Further, in FIG. 21, reference numeral and character A52 denotes a lid body, which is fixed to the housing A25 by the screw A53 to cover the opening at the side of the output shaft A4 in the stator A2 and is provided to stop rotation of the output shaft A4.

In the flow control valve including the stepping motor 1 constructed as described above, the moving amount in the axial direction of the output shaft A4 is determined in accordance with the rotational angle of the rotor A3, and therefore, the opening degree of the valve port 104 can be accurately adjusted by the valve body A41.

Further, in the stepping motor 1, by use in an open loop, an electric current normally passes into the coil A21, and even when jour heat normally occurs from the coil A21, the heat is transmitted to the yoke A23 via the bobbin A22, and further transmitted to the case A24. The heat which occurs to the coil A21 is also directly transmitted to the case A24, which encloses the outer periphery, by radiant heat. Then, the heat, which is transmitted to the case A24, can be released to the valve body 100 via the installation surface 101, with which the flange A24b is in close contact, from the flange A24b of the case A24.

Therefore, heat release performance of the heat occurring to the coil A21 can be enhanced though the periphery of the case A24 is covered with the resin housing A25. Accordingly, the temperature of the coil A21 itself can be reduced, and therefore, insulation failure by the insulation coating being melted can be prevented, thermal deformation of the coil A21, the bobbin A22, the yoke A23, the housing A25 and the like can be prevented. In addition, since the temperature of the coil A21 lowers, there is no possibility of occurrence of thermal demagnetization to the magnet A31 of the rotor A3 in close vicinity to the coil A21, and characteristics such as torque as a motor can be prevented from deteriorating.

Figure 27:
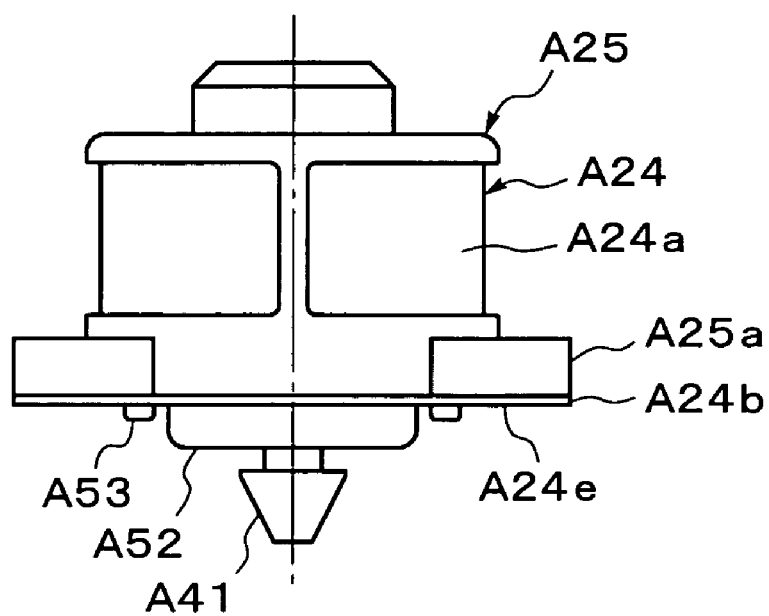
FIG. 27 is a view showing the outer appearance of the stepping motor, and is a front view showing another example of the housing.

In the above described third embodiment, the whole outer peripheral surface of the cylindrical part A24a in the case A24 is constructed to be covered with the housing A25 made of a resin, but as shown in FIG. 27, the housing A25 may be constructed by being molded of the rein so that a part of the outer peripheral surface of the cylindrical part A24a is exposed.

In the case of such a construction, a part of the cylindrical part A24a in the case A24 which is formed of a material with favorable thermal conductivity such as iron is in the state exposed to the atmosphere around the stepping motor 1, and therefore, heat transmitted to the case A24 can be efficiently released to the above described atmosphere side.

Accordingly, various problems which occur due to a rise in temperature of the aforementioned coil A21 can be reliably prevented.

Fourth Embodiment

Next, a fourth embodiment of the invention will be explained with reference to FIGS. 28 to 30. However, the common components to the third embodiment are given the same reference numerals and characters and the explanation thereof will be simplified.

The point in that the fourth embodiment differs from the above described embodiment is that a magnetic circuit is constructed for each bobbin A22 by the first yoke A23 and a second yoke A230 without providing the case A24, and a heat releasing means A26 is provided.

Figure 28:
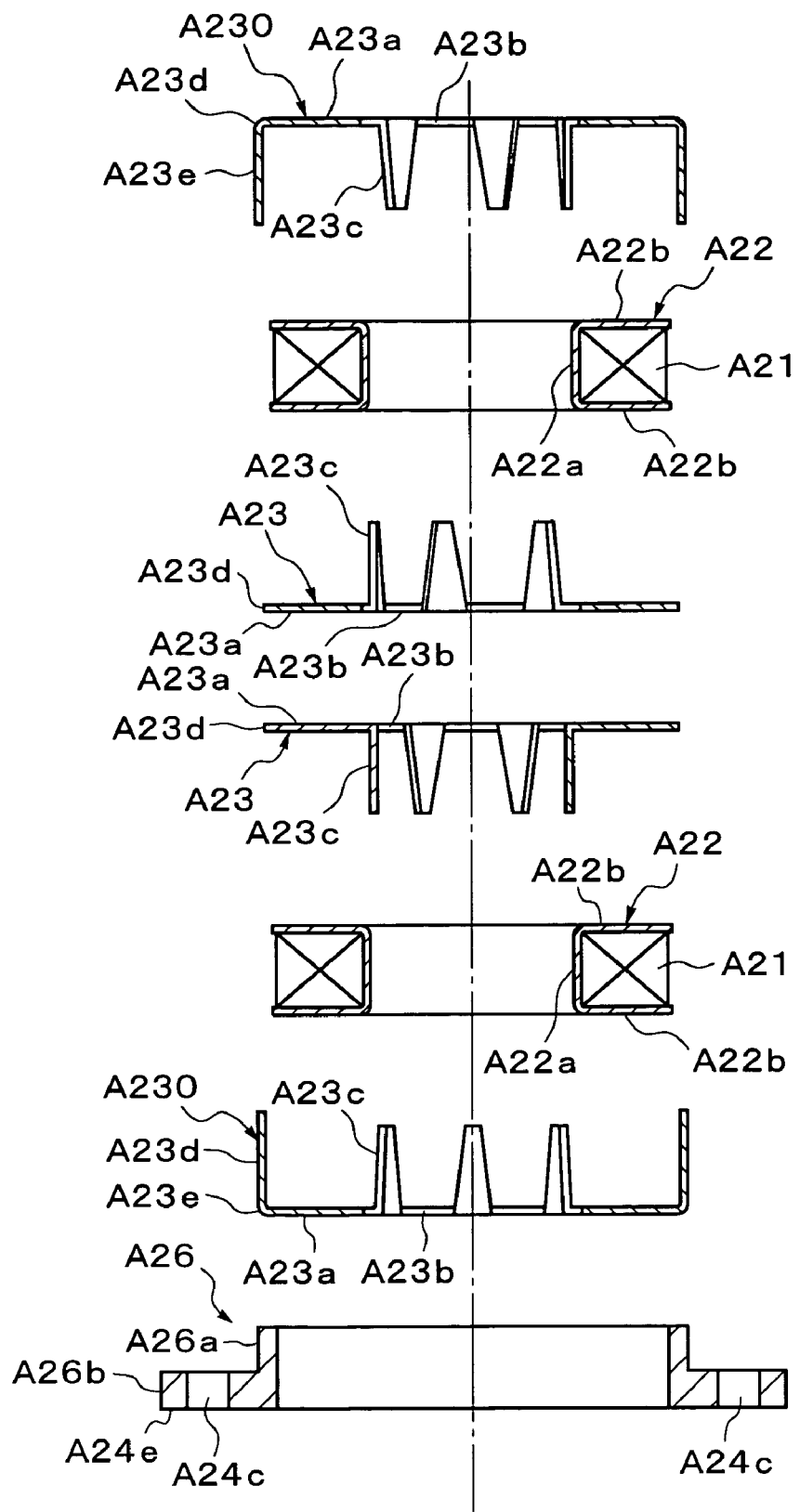
FIG. 28 is an exploded sectional view showing a bobbin having a coil, a first yoke, a second yoke and heat releasing means in a stepping motor shown as a fourth embodiment of the invention.
Figure 29:
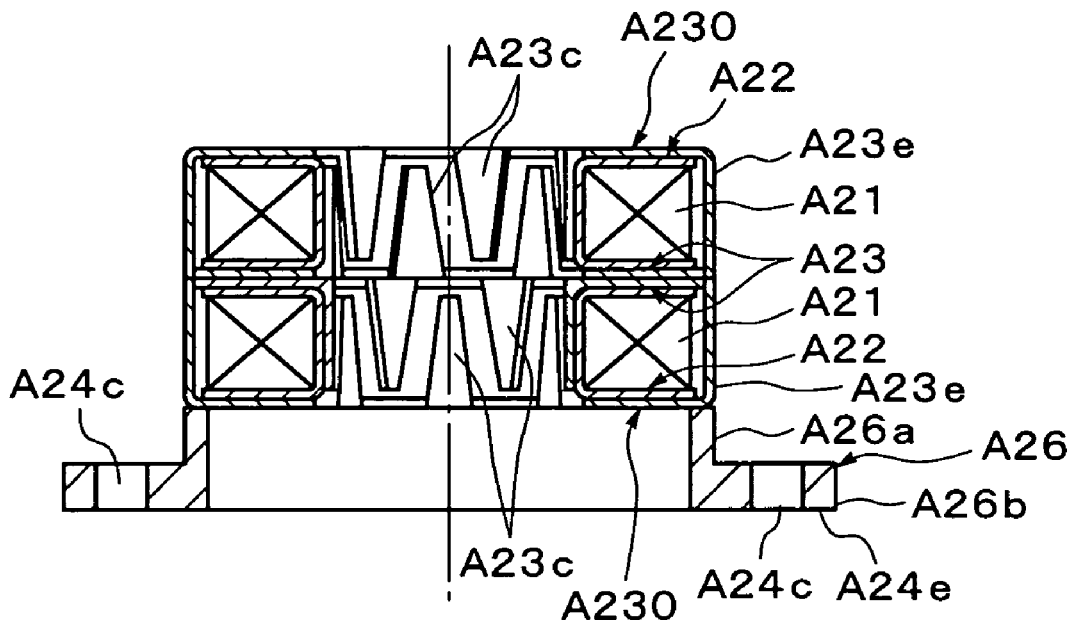
FIG. 29 is a sectional view showing a state in which the bobbin having a coil, a first yoke, a second yoke and heat releasing means are assembled in the same stepping motor.
Figure 30:
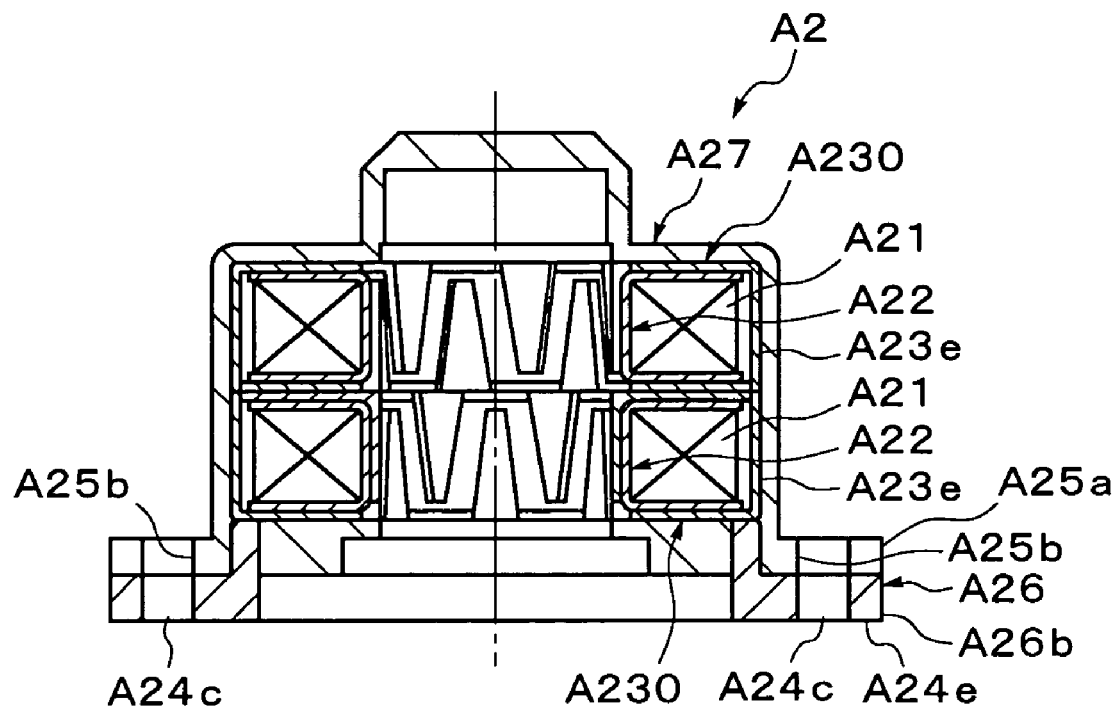
FIG. 30 is a sectional view showing a stator including the coil, the bobbin, the first yoke, the second yoke the heat release means and a housing in the same stepping motor.

The first yoke A23 is the yoke A23 shown in FIG. 23 in the above described third embodiment, and is the same as the yokes A23 which are disposed at back-to-back positions, and therefore, they are shown in FIGS. 28 to 30 by the reference numeral and character "A23".

The second yoke A230 corresponds to the yoke A23 shown in the above described FIG. 23 and corresponds to the yokes A23 disposed at both end portions in the axial direction, and the same parts as this yoke A23 are shown in FIGS. 28 to 30 by the same reference numerals and characters.

Namely, in this first yoke A23, each of the pole teeth A23c is provided to be along the inner peripheral surface of the cylindrical part A22a of the bobbin A22, and the hollow disk part A23a connecting to each of the pole teeth A23c is provided along the outer surface of one flange part A22b of the bobbin A22 (one end surface in the axial direction of the bobbin A22).

On the other hand, the second yoke A230 is formed by the one integrally having a cylindrical outer cylinder part A23e which extends from the outer peripheral edge A23d of the hollow disk part A23a coaxially with the hollow disk part A23a and in the same direction as each of the pole teeth A23c.

In this second yoke A230, each of the pole teeth A23c is provided to be along the inner peripheral surface of the cylindrical part A22a of the bobbin A22 with each of the pole teeth A23c and each of the pole teeth A23c of the first yoke A23 alternately disposed, the hollow disk plate A23a connecting to each of the pole teeth A23c is provided along the outer surface of the other flange part A22b of the bobbin A22 (the other end surface in the axial direction of the bobbin A22), and the outer cylinder part A23e connecting to the hollow disk part A23a is provided so that it extends in the axial direction at the outer peripheral side of the bobbin A22 toward one flange part A22b to the other flange part A22b, and an inner peripheral surface of its tip end portion is in close contact with the outer peripheral edge A23d of the first yoke A23.

Then, the first stator constructed by the bobbin A22 having the coil A21, the yoke constituted of the first yoke A23 and the second yoke A230 provided to encircle the bobbin A22 is layered on the second stator constructed in the same way with the respective first yokes A23 closely contacting back to back. In this state, it is preferable to construct the tip end portions of the outer cylinder parts A23e in the respective second yokes A230 to be in close contact with each other.

The heat release means A26 is integrally formed of a metal with high heat conductivity such as iron, and has the cylinder part A26a and the flange A26b.

The cylinder part A26a has the outer peripheral surface formed to have substantially the same diameter as the outer peripheral surface of the outer cylinder part A23e in the second yoke A230, and the cylindrical part A26a is provided so that one end portion in the axial direction is in close contact with the hollow disk part A23a of one (lower part in the drawing) of the second yoke A230 in the state in which it is disposed coaxially with the second yoke A230.

The flange A26b is formed to be extend outward in the radius direction from the other end portion in the axial direction of the cylindrical part A26a, and it is connected to the valve body 100 in the state in which it abuts on the installation surface 101 of the valve body 100. However, the flange A26b has the same construction as the flange A24b of the third embodiment, the reference numerals and characters shown in the third embodiment about the through-hole A24c and the heat transfer surface A24e are used, and shown in FIGS. 28 to 30.

Besides, a housing A27 molded of a resin to integrally connect the bobbin A22 having the coil A21, the first yoke A23, the second yoke A230 and the heat release means A26 is provided. Then, the same stator A2 as the stator A2 shown in the third embodiment is constructed by the bobbin A22 having the coil A21, the first yoke A23, the second yoke A230, the heat release means A26 and the housing A27.

However, the housing A27 has the same construction as the flange A24b of the third embodiment, and therefore, it is shown in FIGS. 29 and 30 by using the same reference numerals and characters shown in the third embodiment for the flange part A25a and the through-hole A25b.

The constructions of the rotor A3, the output shaft A4 and the like shown in FIG. 21 other than the stator A2 are the same as those in the third embodiment, and therefore, explanation of the illustration and construction as the fourth embodiment will be omitted.

In the stepping motor constructed as described above, the heat generating in each of the coils A21 is transmitted to the first and the second yokes A23 and A230 via each of the bobbins A22, and is directly transmitted to the outer cylinder part A23e of the second yoke A230 as radiant heat. Then, the heat transmitted to each of the yokes A23 and A230 is transmitted to the second yoke A230 located at the heat release means A26 side via each of the yokes A23 and A230 which are in close contact with each other, and is released to the valve body 100 from the flange A26b of the heat release means A26 via the heat release means A26 which is in close contact with the second yoke A230.

Accordingly, release performance of the heat generating in the coil A21 can be enhanced, and therefore, the problems such as insulation failure, thermal deformation, deterioration of characteristics of the motor and the like which are caused by the coil A21 rising in temperature can be prevented as in the third embodiment.

In addition to the above, the same operational effects as in the third embodiment are provided.

The entire outer peripheral surface of each of the outer cylinder parts A23e which are vertically located is also covered with the housing A27 made of a resin in the fourth embodiment, but the housing A27 may be provided so that a part of the outer peripheral surface of each of the outer cylinder parts A23e is exposed as the one shown in FIG. 27.

Fifth Embodiment

Next, a fifth embodiment of the invention will be explained with reference to FIGS. 31 to 35B.

Figure 31:
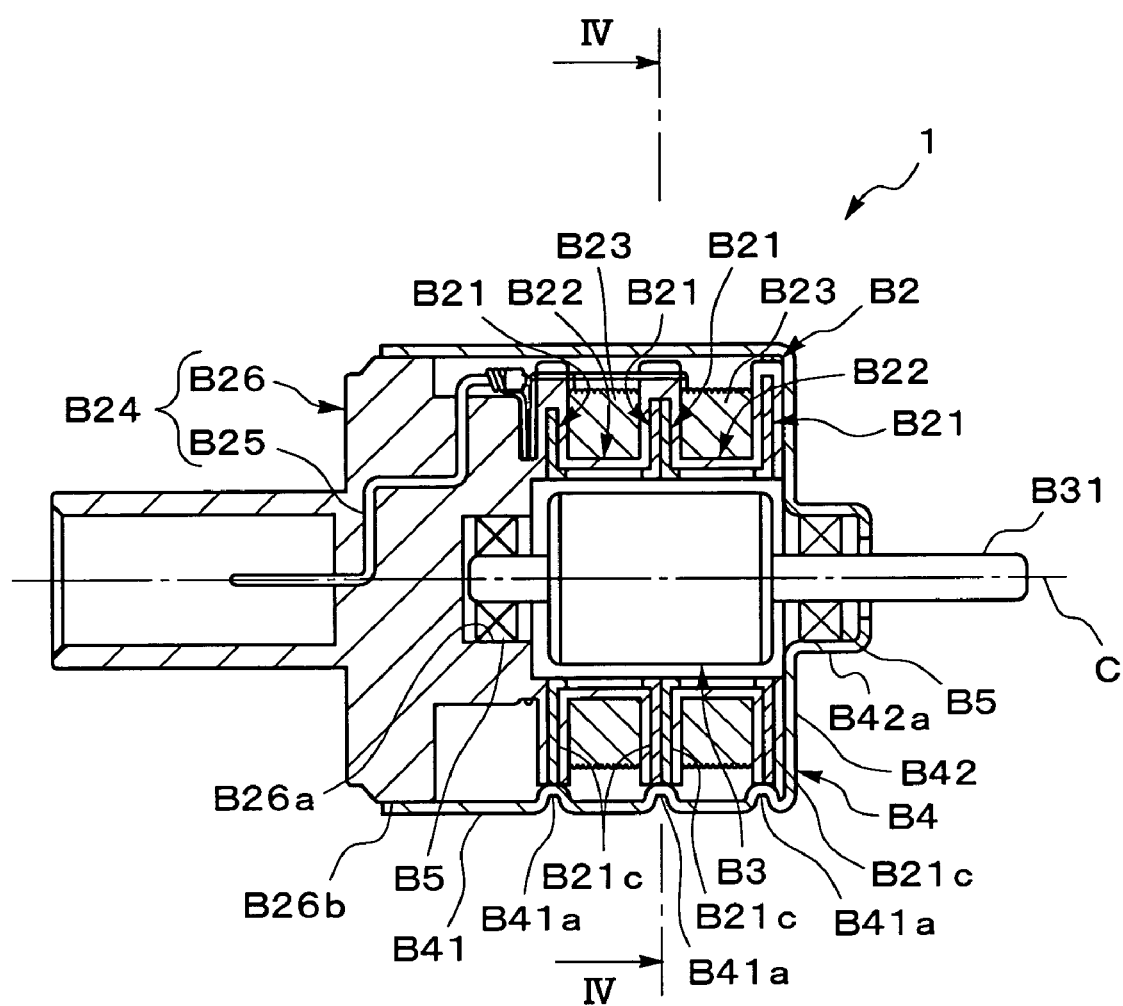
FIG. 31 is a sectional view showing a stepping motor shown as a fifth embodiment of the invention.
Figure 32:
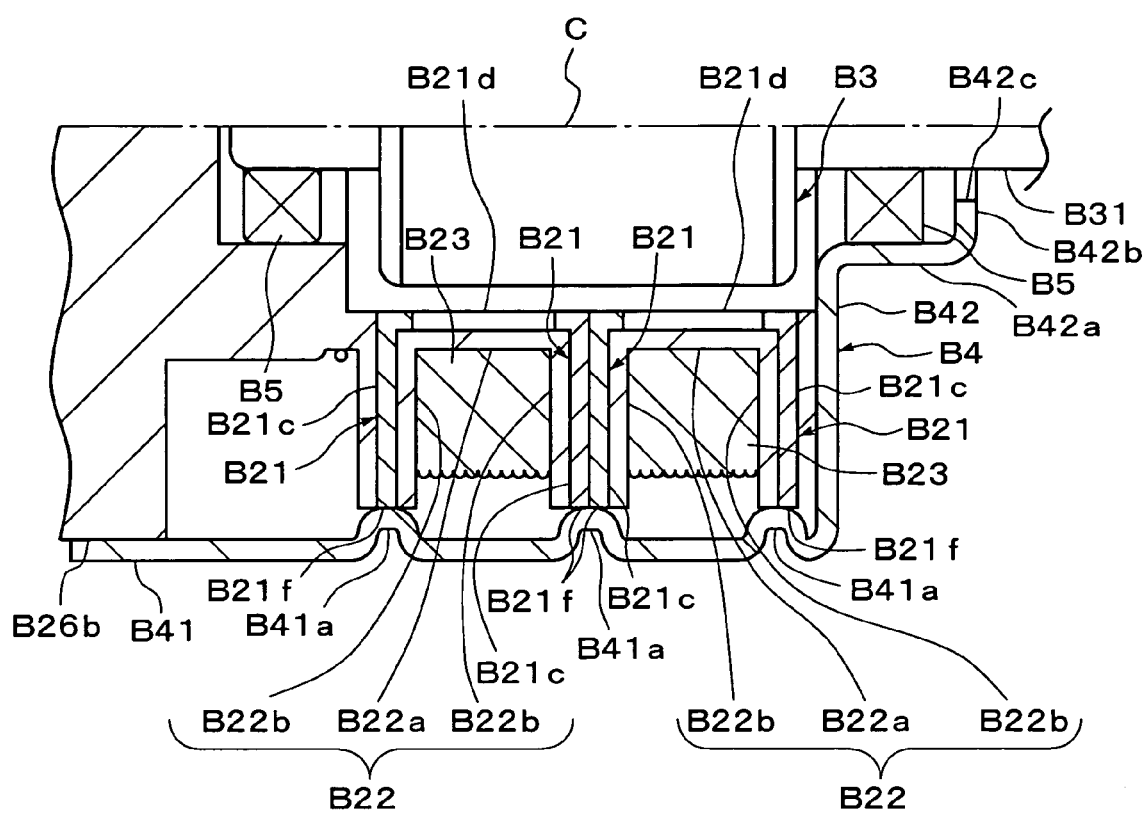
FIG. 32 is a sectional view of a main part of the stepping motor.
Figure 33:
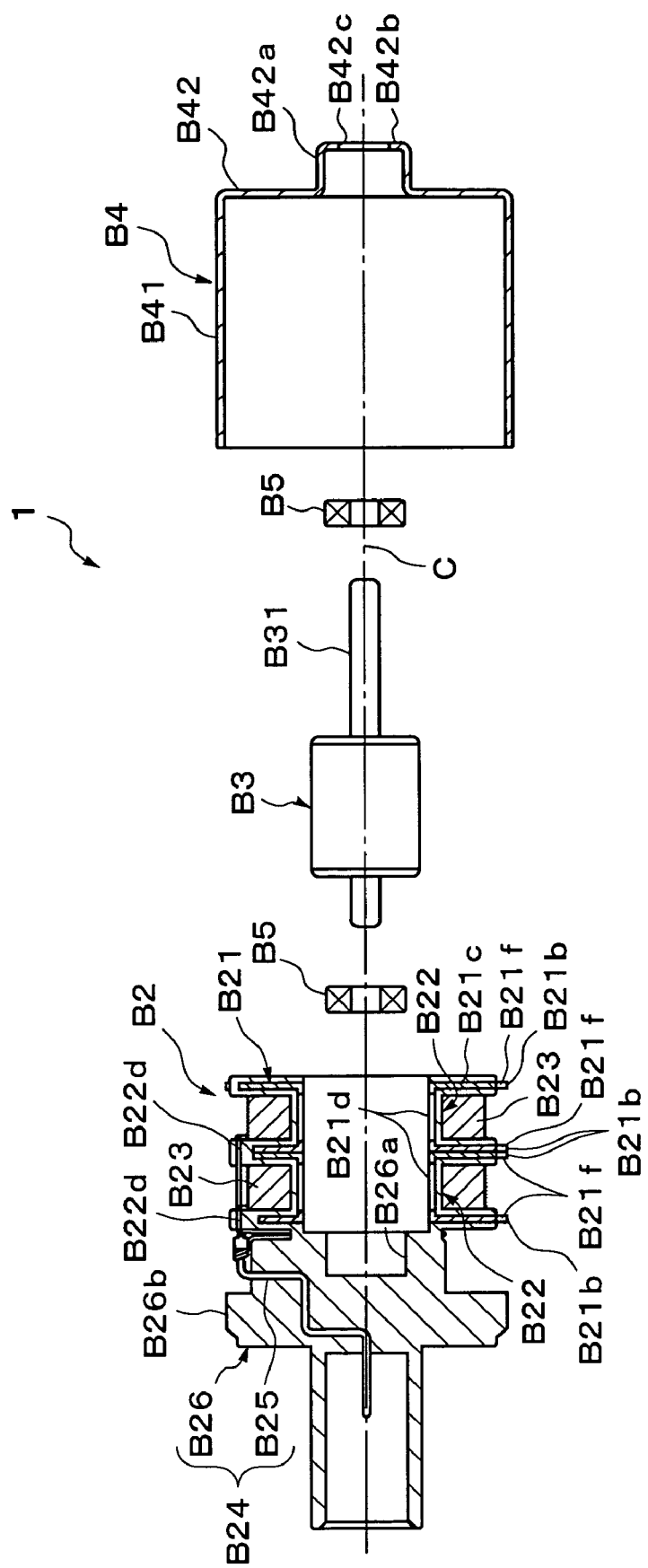
FIG. 33 is an exploded sectional view of the same stepping motor.

As shown in FIGS. 31 to 33, the stepping motor 1 shown in this embodiment has the construction including a stator B2, a rotor B3 having a permanent magnet magnetized in multiple poles in a circumferential direction, a case B4, and a pair of ball bearings (bearing) B5 which holds a shaft B31 disposed at an axis portion of the rotor B3 rotatably with respect to the stator B2 and the case B4.

The stator B2 includes a plurality of yokes (magnetic pole plates) B21 for constructing a magnetic circuit, a pair of resin bobbins B22 which integrally hold these yokes B21 and connected in the axial direction, a coil (winding) B23 wound around each of the bobbins B22, and a connector B24 disposed at one end portion side in the axial direction of one of the bobbins B22. The connector B24 has a construction including a plurality of (6 in this embodiment) pins B25 for connecting the coil B23 wound around each of the bobbins B22 to a female contact (external conductor) not shown, and a resin connector housing B26 which integrally holds these pins B25. The pin B25 and the coil B23 are connected by soldering, for example.

Figures 35A, 35B:
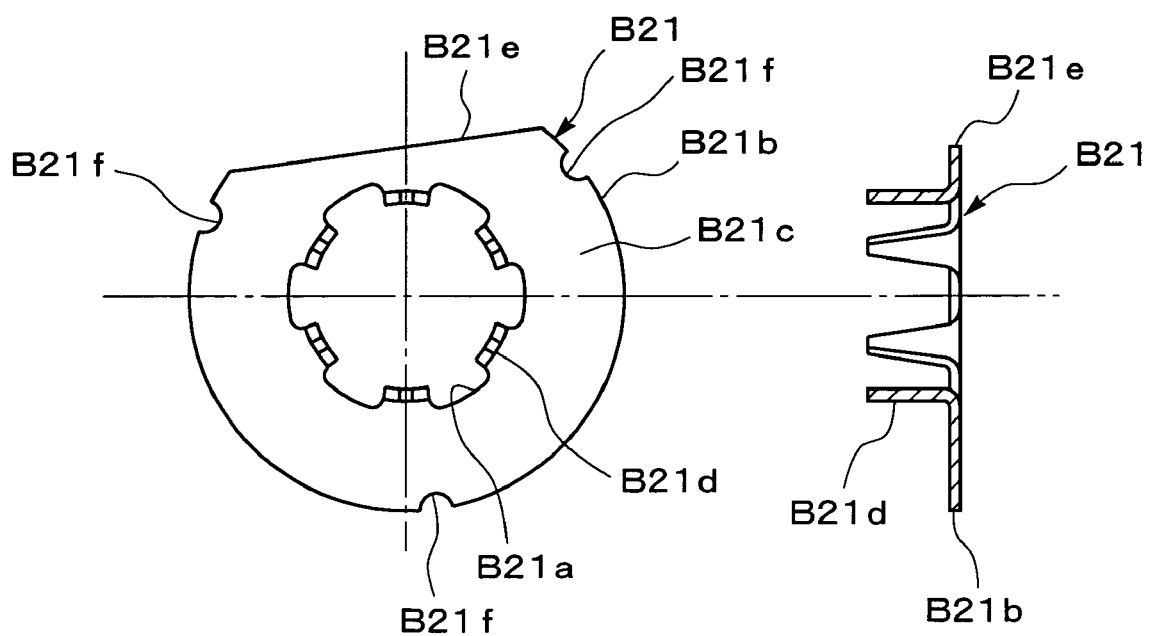
FIG. 35A is a front view showing a yoke of the same stepping motor.
FIG. 35B is a side sectional view showing the yoke of the same stepping motor.

As shown in FIGS. 35A and 35B, the yoke B21 is integrally formed by a magnetic substance such as iron, and includes a hollow disk part (planar part) B21c in which a circular inner peripheral edge B21a and outer peripheral edge B21b are coaxially formed, a plurality of (6 in this embodiment) pole teeth (magnetic pole parts) B21d formed by being bent in the axial direction from the inner peripheral edge B21a of the hollow disk part B21c, and a notch part B21e which is formed by linearly notching a part of the outer peripheral edge B21b in the hollow disk part B21c.

Namely, the yoke B21 is integrally formed by the pole teeth B21d disposed along the inner peripheral surface of the bobbin B22 which will be described later, and the hollow disk part 21c disposed along the end surface in the axial direction of the bobbin B22.

Further, in the yoke B21, a plurality (three in this embodiment) of recessed portions B21f, which is in a shape recessed to the inner peripheral edge B21a side with respect to the outer peripheral edge B21b, are provided at the outer peripheral edge B21b except for the notch part B21e.

Each of the recessed portions B21f is formed into an arcuate recessed shape, and is provided at two positions in close vicinity to one end and the other end of the notch portion B21e at the outer peripheral edge B21b and a substantially central position between these two positions.

Two of the yokes B21 thus constructed are provided to one bobbin B22 as shown in FIGS. 31 to 34. Namely, as shown in FIG. 32, two of the yokes B21 are provided for one bobbin B22 by disposing the hollow disk part B21c at each end surface in the axial direction of the bobbin B22, and by alternately disposing the pole teeth B21d along the inner peripheral surface of the bobbin B22. The hollow disk parts B21c disposed at the adjacent end surfaces of the respective bobbins B22 abut on each other back to back.

Each of the yokes B21 is disposed on the same axis, the outer peripheral edge of each of the hollow disk part B21c and the part of each of the pole teeth B21b except for the inner peripheral surface are covered with the resin constructing a pair of bobbins B22, and are fixedly held by the resin.

Further, the central hollow disk parts B21c which abut on each other back to back are placed so that each of the recessed portions B21f are at the same position.

Each of the bobbins B22 is integrally formed by a cylinder part B22a and a flange part B22b enlarged in diameter into a disk shape from each end portion in the axial direction of the cylinder part B22a, as shown in FIG. 32, and the above described pole teeth B21d are disposed along the inner peripheral surface of the cylindrical part B22a, and the above described hollow disk part 21c is disposed along the end surface at the outer side in the axial direction of each of the flange parts B22b.

Each of the bobbins B22 is integrally molded of a resin (PBT, for example), and thereby, the bobbins B22 are in the state connected in the axial direction with the above described respective yokes B21 taken therein. The bobbin B22 is molded integrally with a later-described connector housing B26.

In each of the yokes B21, a portion along the outer peripheral edge B21b except for the notch part B21e in the hollow disk part B21c is projected outward in the radius direction from the outer peripheral edge of each of the flange parts 22b on the bobbin B22. Further, each of the recessed portions B21f is formed at the portion projected outward in the radius direction from each of the flange parts B22b in the hollow disk plate part B21c.

The connector housing B26 is integrally formed of the same resin as the bobbin B22 at one of the connected bobbins B22 in the axial direction.

As shown in FIG. 33, in the connector housing B26, a bearing hole B26a which holds one of the above described pair of ball bearings B5 is formed at an end surface at the bobbin B22 side. The bearing hole B26a is formed at the position on the same axis as the center line C of the bobbin B22.

The case B4 is integrally formed by a magnetic substance such as iron, and includes a peripheral wall part (cylindrical part) B41, and a planar lid body B42 which closes one end portion of the peripheral wall part B41. The peripheral wall part B41 is formed so that its inner peripheral surface is fitted on the outer peripheral edge B21b of each of the yokes B21 and the outer peripheral surface B26b of the connector housing B26, and the lid body B42 abuts on an end surface at an opposite side from the end portion of the connected bobbin B22, where the connector housing B26 is integrally formed, in the stator B2.

In the lid body B42, a bearing projection portion B42a which holds the other one of the above described pair of ball bearings B5 is formed at its axis position, and a through-hole B42c through which the shaft B31 integrated with the rotor B3 is inserted is formed in the end surface B42b of the bearing projection portion B42a.

Further, a connecting recessed part B41a, which is elastically deformed to be put into each of the recessed portions B21f of the outer peripheral edge B21b of the yoke B21 in the state in which the peripheral wall part B41 is fitted onto the outer peripheral edge B21b of the yoke B21 and the outer peripheral surface B26b of the connector housing B26 and the lid body B42 is caused to abut on the end surface at the opposite side from the end portion where the connector housing B26 of the connected bobbin B22 in the stator B2 is integrally formed, is formed in the peripheral wall part 41 of the case b4.

Figure 34:
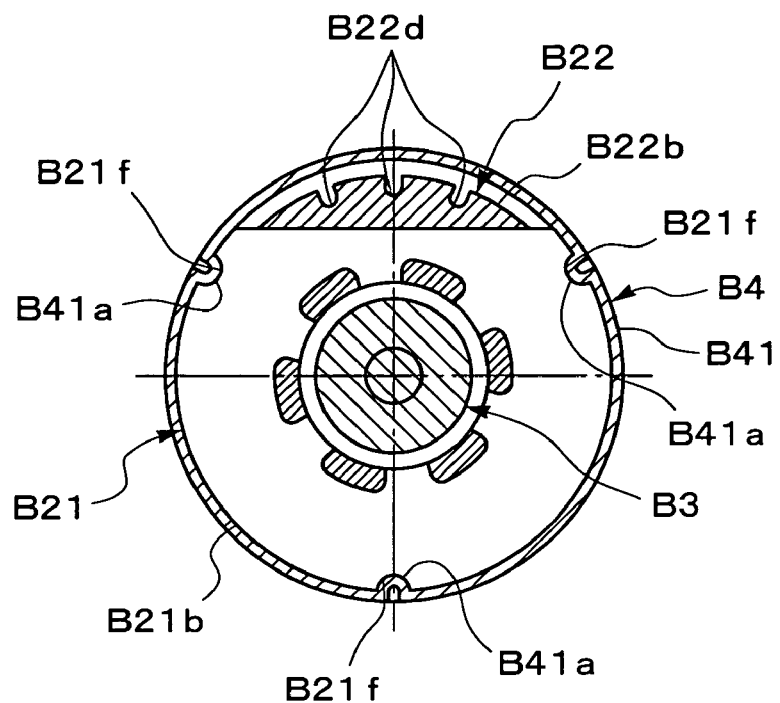
FIG. 34 is a view showing the same stepping motor and is a sectional view taken along the line IV to IV in FIG. 31.

In FIG. 34, reference numeral and character B22d denotes a groove which is provided at the outer peripheral portion of the flange part B22b of the bobbin B22.

Next, a manufacturing method of the stepping motor 1 constructed as described above will be explained.

First, the above described plurality of yokes B21 and pins B25 are inserted into a mold not shown for molding the bobbin B22 and the connector housing B26, and thereafter, a resin is poured into the mold. Thereby, the bobbin B22 and the connector housing B26 in which each of the yokes B21 and each of the pins B25 are mounted is completed.

Then, as shown in FIGS. 31 and 33, the coil B23 is wound around each of the bobbins B22, and thereafter, an end portion of each of the coils B23 is soldered to one end portion of each of the pins B25.

One of the ball bearings B5 is fitted in the bearing hole B26a of the connector housing B26, and the base end portion of the shaft B31 in the rotor B3 is inserted into the ball bearing B5. Further, the peripheral wall part B41 of the case B4, where the other ball bearing B5 is fitted in the bearing projected part B42a, is fitted onto the outer peripheral edge B21b of the yoke 21 and the outer peripheral surface B26b of the connector housing B26, the tip end portion of the shaft B31 is projected outward from the other ball bearing B5 and the through-hole B42c, and the lid body B42 is caused to abut on the end surface at the opposite side from the end portion at which the connector housing B26 of the connected bobbins B22 in the stator B2.

Next, as shown in FIGS. 32 and 34, the portion in the peripheral wall portion B41, which corresponds to each of the recessed portions B21f of each of the hollow disk part B21c, is crimped to be pushed into each of the recessed portions B21f, whereby the connecting recessed part B41a which is in close contact with each of the recessed portions 21f is formed.

Thereby, the case B4 is firmly fixed to the stator B2 via each of the yokes B21, and rotatably supports the rotor B3 via each of the ball bearings B5 with the stator B2.

The base B4 and the stator B2 may be connected more firmly by using fixing means such as an adhesive, welding, and a screw. The stator B2 is defined as including the yoke B21, the bobbin B22, the coil B23 and the connector B24 as described above, but the case B4 may be defined as one component of the stator B2.

Since in the stepping motor 1 as constructed as described above, the recessed portions B21f are provided at the outer peripheral edge B21b of the hollow disk part B21c, and the connecting recessed portions 41a which is to be pushed into the recessed portions B21f are provided in the peripheral wall part B41, the inner peripheral surface of the peripheral wall part B41 can be reliably brought into contact with the outer peripheral edge B21b of the hollow disk part B21c.

Namely, even if a little gap in fitting exists between the outer peripheral edge B21b and the inner peripheral surface of the peripheral wall part B41, in the state in which the peripheral wall part B41 is fitted onto the outer peripheral edge B21b of the hollow disk part B21c, a part of the peripheral wall portion B41 is pushed into the recessed portions B21f of the hollow disk part B21c as the connecting recessed portions 41a, whereby the length in the circumferential direction of the peripheral wall part B41 can be reduced, and the inner peripheral surface of the peripheral wall part B41 can be brought into close contact with the outer peripheral edge B21b of the hollow disk part B21c. In this case, the connecting recessed portions B41a can be brought into close contact with the recessed portions B21f.

In addition, since the connecting recessed portions B41a are brought into the state in which they engage with the recessed portions B21f of the hollow disk part B21c, close contact state of the inner peripheral surface of the peripheral wall part B41 and the outer peripheral edge B21*b* of the hollow disk part B21*c* can be reliably maintained, and the yoke B21 and the case B4 can be firmly connected.

Accordingly, a part of the magnetic circuit in which magnetism occurring in one coil B23 flows to a predetermined magnetic pole of the rotor B3 from the pole tooth B21*d* in one yoke B21 corresponding to the coil B23, then flows to the pole tooth B21*d* of the other yoke B21 from the magnetic pole, and flows to the one yoke B21 again from the other yoke B21 via the peripheral wall part B41 can be constructed by the above described each of the yokes B21 and the peripheral wall part B41. In addition, leakage of the magnetic lines of force in the border portion of the yoke B21 and the case B4 can be prevented as much as possible. Therefore, efficiency of the stepping motor 1 can be enhanced.

Since the portion corresponding to the hollow disk part B21*c* in the peripheral wall part B41 can be reduced in diameter by the connecting recessed portions B41*a*, the diameter of the peripheral wall part B41 can be sufficiently reduced with respect to the diameter of the outer peripheral edge B21*b* of the hollow disk part B21*c* even if the deformation amount is small as the connecting recessed portions B41*a*, and the inner surface of the peripheral wall part B41 can be firmly brought into close contact with the outer peripheral edge B21*b* of the hollow disk part B21*c*.

Figure 36:
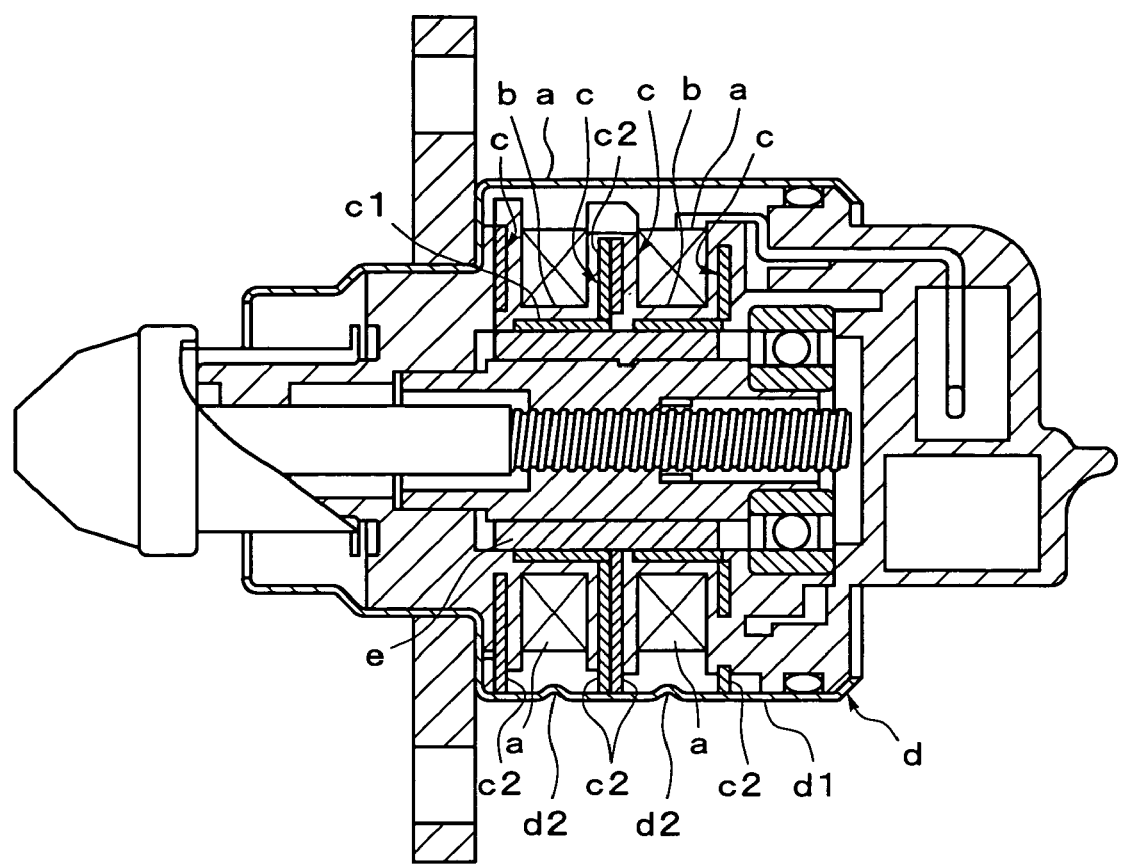
FIG. 36 is a sectional view of a stepping motor shown as a prior art example with respect to the same stepping motor.

The conventional stepping motor has the structure in which the hollow disk part c2 of each of the yokes c and the peripheral wall part (cylinder part) d1 of the case dare in close contact by the recessed part d2 as shown in FIG. 36. Namely, the recessed portion d2 is formed by pressing a part of the peripheral wall part d1 between the hollow disk parts C2 to the coil a side, and the inner peripheral surface of the peripheral wall part d1 is brought into close contact with the outer peripheral edge of the hollow disk part c2 by the recessed portions d2, whereby leakage of the magnetic force line at the border portion between the peripheral wall part d1 and each of the hollow disk part c2 is restrained. In FIG. 36, reference character b denotes a bobbin, reference numeral and character c1 denotes a pole tooth, and reference character e denotes a rotor.

However, even when the recessed portions d2 are formed, a part of the peripheral wall part d1 separates from the outer peripheral edge of the hollow disk part c2 by spring back after formation of them, and the inner peripheral surface of the peripheral wall part d1 cannot be sometimes brought into close contact with the outer peripheral edge of the hollow disk part c2 sufficiently. In order to prevent such a problem, it is necessary to increase plastic deformation amount to an inside of the recessed portions d2, but in this case, the peripheral wall part d1 is in close vicinity to the coil a, and therefore, withstand voltage resistance between the coil a and the case d reduces.

In this case, in order to obtain sufficient withstand voltage resistance between the coil a and the case d, it is necessary to decrease the number of windings of the coil a, or to increase the diameters of the outer peripheral edge of the hollow disk part c2 and the inner peripheral surface of the peripheral wall part d1. However, when the number of windings of the coil a is reduced, torque occurring to the rotor e reduces, and when the diameters of the outer peripheral edge of the hollow disk part c2 and the inner peripheral surface of the peripheral wall part d1 are increased, the new problem of increasing the stepping motor in size occurs.

On the other hand, in this embodiment, even if the deformation amount of the connecting recessed part B41*a* is reduced to be small, the inner peripheral surface of the peripheral wall part B41 can be reliably brought into close contact with the outer peripheral edge B21*b* of the hollow disk part B21*c*.

Accordingly, after the connecting recessed portions B41*a* are formed, withstand voltage resistance between the coil B23 and the case B4 can be maintained to be sufficiently high. Therefore, occurrence of the harmful effects that torque of the stepping motor is reduced by reducing the number of windings of the coil B23 and the stepping motor increases in size by increasing the diameters of the outer peripheral edge B21*b* of the hollow disk part B21*c* and the inner peripheral surface of the peripheral wall part B41 can be prevented.

Further, since recessed portions B21*f* are provided at three locations that are the two locations in close vicinity to one end and the other end of the notch part B21*e* in the outer peripheral edge B21*b* of the hollow disk part B21*c*, the connecting recessed portion B41*a* is formed for the recessed portion B21*f* at the substantially central location after the connecting recessed portion B41*a* is formed for each of the recessed portions B21*f* in the vicinity of the notch part B21*e*, whereby the peripheral wall part B41 at the portions corresponding to the outer peripheral edge part B21*b* can be reduced in diameter while reduction in diameter of the peripheral wall part B41 at the portion corresponding to the notch part B21*e*.

Accordingly, even when the notch part B21*e* is included, the peripheral wall part B41 can be reliably brought into close contact with the outer peripheral edge B21*b* of the hollow disk part B21*c*.

In the above described fifth embodiment, three recessed portions B21*f* are provided at the yoke B21, but one or two or more recessed portions B21*f* may be provided.

However, when one or more notch parts B21*e* is or are included as described above, it is preferable to provide the recessed portion B21*f* at each location in the vicinity of the notch part B21*e* in the outer peripheral edge B21*b*, to provide one or more recessed portions B21*f* between the recessed portions B21*f*, and to form the connecting recessed portion B41*a* which is pushed into each of the recessed portions B21*f* at the peripheral wall part B41.

Sixth Embodiment

Next, a sixth embodiment of this invention will be explained with reference to FIGS. 37A to 38C.

Figure 37A:
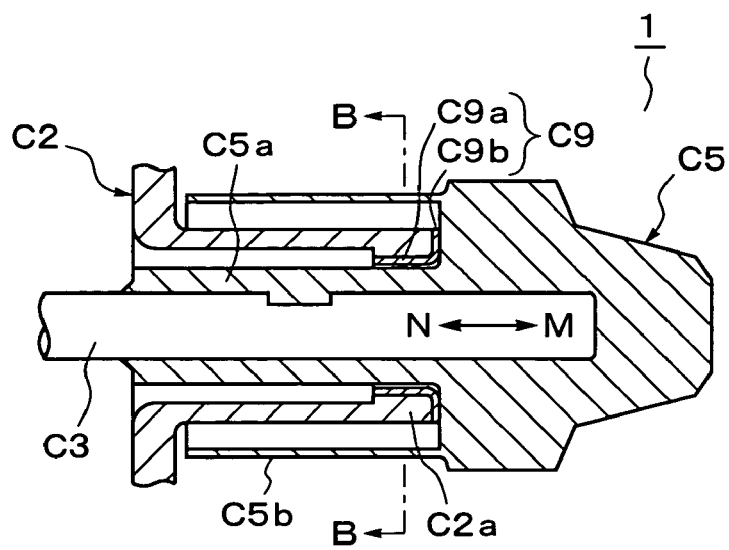
FIG. 37A is a front sectional view showing a stepping motor shown as a sixth embodiment of the present invention.
Figure 37B:
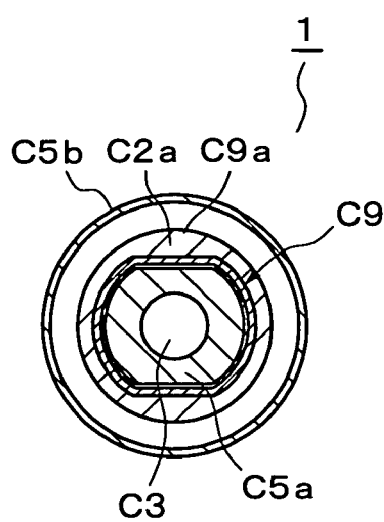
FIG. 37B is a view showing the same stepping motor and is a sectional view taken along the line B to B in FIG. 37A.
Figure 38A:
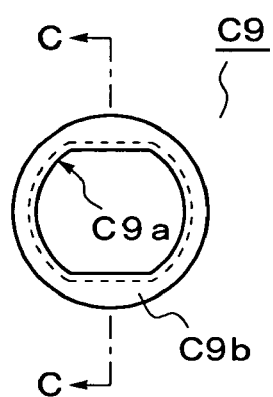
FIG. 38A is a detailed plane view of an abrasion reduction/axial direction locking member of the same stepping motor.
Figure 38C:
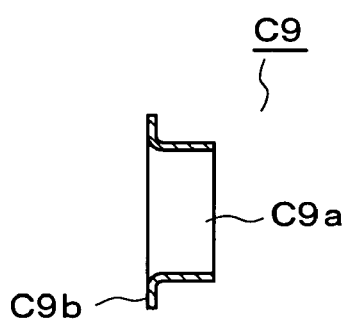
FIG. 38C is a detailed view of the abrasion reduction/axial direction locking member of the same stepping motor and is a sectional view taken along the line C to C in FIG. 38A.
Figure 38B:
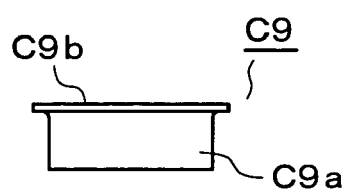
FIG. 38B is a detailed front view of the abrasion reduction/axial direction locking member of the same stepping motor.

FIGS. 37A and 37B are views showing one embodiment of a stepping motor according to the present invention, FIG. 37A is a front sectional view thereof, FIG. 37B is a sectional view by the B to B line in FIG. 37A, FIGS. 38A to 38C are detailed views of an abrasion reduction/axial direction locking member of the stepping motor shown in FIGS. 37A and 37B, FIG. 38A is a plane view thereof, FIG. 38B is a front view thereof, and FIG. 38C is a sectional view by the C to C line in FIG. 38A.

The stepping motor 1 in this embodiment is used for moving the valve body of the valve close to and away from the valve seat for the purpose of adjusting the flow of the mixture gas which is supplied into the cylinder of an automobile engine, for example, and is constructed by including a mechanism which advances and retreats the valve body integrated with the shaft by converting the rotational movement of the rotor supported by the stator into the linear movement of the shaft.

Namely, as shown in FIGS. 37A and 37B, the stepping motor 1 has a substantially cylindrical stator C2 (corresponding to the stators designated by the aforementioned reference numerals and characters 2, B2, A2), and a cylindrical rotor (corresponding to the rotors designated by the aforementioned reference numerals and characters 3, A3 and B3 though not shown in FIGS. 37A to 38C) is inserted into the stator C2 rotatably by electromagnetic force. Further, the shaft C3 is screwed into the rotor to be capable of advancing and retreating in its axial direction (the directions of the arrows M and N). Here, a female screw portion is formed on the inner peripheral surface of the above described rotor, a male screw portion is formed on an outer peripheral surface of the shaft C3, and the male screw portion of the shaft C3 is screwed into the female screw portion of the rotor. The valve body C5 of the valve made of a synthetic resin is integrally mounted to a tip end of the shaft C3 by resin-molding as a controlled body, and as shown in FIG. 37B, a rotation restricted part C5a in a double D cut sectional shape (a kind of non-circular sectional shape and a sectional shape with two portions on the circumference cut out in the D-shape) is formed. Meanwhile, a rotation restricting part C2a is formed at the stator C2 into the shape fitted onto the rotation restricted part C5a of the valve body C5. Further, the cylindrical skirt part C5b is formed at the valve body C5 to cover the abrasion reduction/axial direction locking member C9 as shown in FIG. 37A, and the valve seat (corresponding to the valve seat designated by the aforementioned reference numeral 106 (FIG. 21) though not shown in FIGS. 37A and 37B) is provided to be opposed to the valve body C5 in front of the valve body C5. Accordingly, when the above described rotor rotates in the reciprocal direction, the shaft C3 advances or retreats in the axial direction of the shaft C3 while restricted from its rotation, and the valve body C5 moves close to and away from the above described valve seat with this and the flow of the valve increases and decreases.

Incidentally, as shown in FIGS. 37A and 37B, a metal abrasion reduction/axial direction locking member C9 formed into a flanged cylinder shape is mounted to the rotation restricting part C2a of the stator C2, and the abrasion reduction/axial direction locking member C9 is constructed by a cylindrical part C9a in the sectional shape of double D cut, and a flange part C9b connected to one end of the cylindrical part C9a as shown in FIGS. 38A to 38C.

The stepping motor 1 has the construction as above, and therefore, the shaft C3 advances and retreats in its axial direction (the directions of the arrows M and N), the rotation restricted part C5a of the valve body C5 moves in the axial direction of the shaft C3 with respect to the rotation restricting part C2a of the stator C2, but the abrasion reduction/axial direction locking member C9 is mounted to the rotation restricting part C2a of the stator 2, and the rotation restricted part C5a of the valve body C5 slides with respect to its cylindrical part C9a, thus reducing the abrasion between them. When the shaft C3 retreats in the axial direction (the arrow N direction), the valve body C5 moves to the stator C2 side, but the abrasion reduction/axial direction locking member C9 is mounted to the rotation restricted part C2a of the stator C2, and therefore, the valve body C5 abuts on the flange part C9b and stops the retreating operation of the shaft C3 at a predetermined position.

As described above, in the stepping motor 1 the abrasion reduction/axial direction locking member C9 exhibits the abrasion reducing function of reducing abrasion occurring with advance and retreat in the axial direction of the shaft C3, and exhibits the axial direction locking function of stopping the retreating motion of the shaft C3 at the predetermined position at the same time.

As shown in FIGS. 39A and 39B, in the conventional stepping motor, the metal abrasion reducing member C6 formed into a cylindrical shape is fitted to the outer periphery of the rotation restricted part C5a of the valve body C5 in the valve body C5. The metal axial direction locking member C7 formed into a cylindrical shape is integrally mounted to the valve body C5 for the purpose of stopping the retreating motion at a predetermined position when the shaft C3 retreats to the rotor side (the arrow N direction).

However, in the above described conventional stepping motor, two components that are the abrasion reduction member C6 and the axial direction locking member C7 are needed, and the material cost has to be raised correspondingly. In addition, since the abrasion reduction member C6 is mounted to the valve body C5 side, the abrasion reduction member C6 has to be fitted to the entire length of the stroke of the shaft C3, and when the stroke of the shaft C3 (moving distance of the valve body C5) is especially long, the abrasion reduction member C6 which is long by that length is needed, and in this respect, the material cost of the stepping motor also rises.

In addition, since an operator has to mold with the shaft C3, the abrasion reduction member C6 and the axial direction locking member C7 inserted into a molding die and thereby integrally mold these three components in the molding process step of the valve body C5 on manufacturing the stepping motor, long time is required for molding the valve body C5, and manufacturing cost of the stepping motor rises. It is conceivable to automate the molding process step of the valve body C5 by a robot operation, but it lacks in reality in the respect that high cost is required initially.

On the other hand, in this embodiment, the axial direction locking member C7 is not required as a separate component, and the number of components can be reduced, thus making it possible to reduce material cost or the like.

In addition, the abrasion reduction/axial direction locking member C9 is not mounted to the valve body 5 side, but to the stator C2 side, therefore, even if the stroke of the shaft C3 (moving distance of the valve body C5) is long, it is not necessary to make the cylindrical part C9a of the abrasion reduction/axial direction locking member C9 long corresponding to its length, thus also making it possible to reduce the material cost of the stepping motor 1 from this respect.

As described above, the abrasion reduction/axial direction locking member C9 is not mounted to the valve body C5 side, but to the stator C2 side, and therefore, when the stepping motor 1 is manufactured, it is sufficient to integrally mold only the shaft C3 into the valve body C5 in the molding process step of the valve body C5. As a result, the time required for molding the valve body C5 becomes short as compared with the conventional stepping motor (see FIGS. 39A and 39B) in which the abrasion reducing member C6 and the axial direction locking member C7 have to be integrally molded in addition to the shaft C3, and therefore, it is possible to reduce the manufacturing cost of the stepping motor 1.

Further, the skirt part C5b is formed at the valve body C5 to cover the abrasion reduction/axial direction locking member C9, and therefore, occurrence of the accident in which the fluid passing through the valve enters the stator C2 through a gap between the abrasion reduction/axial direction locking member C9 and the valve body C5 can be restrained.

In the above described embodiment, the case using the valve body C5 as the controlled body is explained, but the present invention can be applied to the stepping motor 1 including the controlled body other than the valve body C5. For example, a connecting member of the reflection mirror in an active headlight of an automobile (headlight capable of controlling an optical axis to head in a traveling direction by moving a reflection mirror laterally or vertically based on the steered angle of a steering wheel and vehicle speed at an intersection, a curve and the like to prevent automobile accident at night).

In the above described embodiment, the case where the double D cut sectional shape is adopted as the sectional shape of the rotation restricted part C5a of the valve body C5 is described, but as long as the sectional shape of the rotation restricted part C5a of the valve body C5 is in the non-circular sectional shape, the rotation of the valve body C5 is restricted, and therefore, any sectional shape may be adopted. For example, it is possible to adopt the sectional shape in which a projected section is placed at one location or more on the circumference of the circular section as the sectional shape of the rotation restricted part C5a of the valve body C5.

INDUSTRIAL APPLICABILITY

According to the present invention, the bobbin and the connector housing are integrally molded of a resin, and therefore the number of components and the number of assembly steps can be reduced as compared with the conventional one which includes the bobbin and the connector housing separately and connecting the bobbin and the connector housing by ultrasonic welding or the like at the time of assembly.

The invention claimed is:

1. A stepping motor comprising:
 a bobbin which integrally holds a yoke for constructing a magnetic circuit; and
 a connector housing which is disposed at one end portion in an axial direction of the bobbin and integrally holds a pin for connecting a winding wire wound around said bobbin to an external conductor, wherein:
 said bobbin and said connector housing are integrally formed of a resin;
 said bobbin has a flange part projected outward in a radius direction to restrict a winding position of the winding wire in the axial direction;
 said connector housing has a terminal installation surface adjacent to the flange part disposed at one end portion in the axial direction in said bobbin and formed at an inner position in the radius direction with respect to an outer peripheral edge of the flange part;
 said pin comprises an end portion that projects from said terminal installation surface to be a terminal part connecting an end portion of said winding wire and the terminal part is folded to be in close vicinity to said terminal installation surface, and thereby, the entire above described terminal part including the connecting part of the above described winding wire is located at an inner position in the radius direction with respect to the outer peripheral edge of said flange part, and
 an auxiliary bobbin part, which is formed at an inner position in the radius direction with respect to said terminal installation surface, and around which a winding wire connected to said terminal part is to be wound, is located between said terminal installation surface and said flange part adjacent to said terminal installation surface.

2. A stepping motor comprising:
 a bobbin which integrally holds a yoke for constructing a magnetic circuit; and
 a connector housing which is disposed at one end portion in an axial direction of the bobbin and integrally holds a pin for connecting a winding wire wound around said bobbin to an external conductor wherein:
 said bobbin and said connector housing are integrally formed of a resin;
 said bobbin has a flange part projected outward in a radius direction to restrict a winding position of said winding wire to said axial direction;
 said connector housing has a terminal installation surface adjacent to said flange part disposed at one end portion in said axial direction in said bobbin and formed at an inner position in the radius direction with respect to an outer peripheral edge of the flange part;
 said pin comprises an end portion that projects from said terminal installation surface to be a terminal part connecting an end portion of said winding wire, and an upper end including a connecting portion of said winding wire in the terminal part is located at an inner position in the radius direction with respect to the outer peripheral edge of said flange part;
 an auxiliary bobbin part, which is formed at an inner position in the radius direction with respect to said terminal installation surface, and around which a winding wire connected to said terminal part is to be wound, is located between said terminal installation surface and said flange part adjacent to said terminal installation surface.

* * * * *